(12) United States Patent
Nagata et al.

(10) Patent No.: US 11,678,722 B2
(45) Date of Patent: Jun. 20, 2023

(54) SHOE AND METHOD OF MANUFACTURING SHOE

(71) Applicant: ASICS CORPORATION, Kobe (JP)

(72) Inventors: Shintaro Nagata, Kobe (JP); Shinsaku Wakasugi, Kobe (JP)

(73) Assignee: ASICS CORPORATION, Kobe (JP)

( * ) Notice: Subject to any disclaimer, the term of this patent is extended or adjusted under 35 U.S.C. 154(b) by 55 days.

(21) Appl. No.: 15/734,530

(22) PCT Filed: Aug. 30, 2018

(86) PCT No.: PCT/JP2018/032119
§ 371 (c)(1),
(2) Date: Dec. 2, 2020

(87) PCT Pub. No.: WO2020/044492
PCT Pub. Date: Mar. 5, 2020

(65) Prior Publication Data
US 2021/0227936 A1  Jul. 29, 2021

(51) Int. Cl.
*A43B 23/07* (2006.01)
*A43B 9/00* (2006.01)
*A43B 23/02* (2006.01)

(52) U.S. Cl.
CPC ............... *A43B 23/07* (2013.01); *A43B 9/00* (2013.01); *A43B 23/025* (2013.01)

(58) Field of Classification Search
None
See application file for complete search history.

(56) References Cited

U.S. PATENT DOCUMENTS 2,034,091 A * 3/1936 Dunbar ............ A43B 5/10
                                              12/142 E
2,484,215 A   10/1949 Foster
(Continued)

FOREIGN PATENT DOCUMENTS

JP      2001029110 A     2/2001

OTHER PUBLICATIONS

The extended European search report issued by the European Patent Office dated Apr. 29, 2021, which corresponds to European Patent Application No. 18932247.2-1005 and is related to U.S. Appl. No. 15/734,530.
(Continued)

*Primary Examiner* — Jila M Mohandesi
(74) *Attorney, Agent, or Firm* — Studebaker & Brackett PC

(57) ABSTRACT

A shoe includes: an upper member containing a knit fabric, a knit-like fabric, and/or a woven fabric as a primary member and forming a part of a medial side surface, a part of a lateral side surface, and a part of a back surface; an outsole member made of thermoplastic resin and forming a bottom portion including a contact surface, and a peripheral portion attached at least partially to respective lower parts of the medial and lateral side surfaces and a lower part of the back surface and connected to the bottom portion; and a sock liner inserted in interior space defined by the upper member and the outsole member. The upper member defines an opening at which at least a part of the lateral side surface is cut. The outsole member includes a window portion covering the opening. The window portion is made of a semi-transparent material that makes at least a part of a lateral side surface of the sock liner in the interior space visible through the window portion covering the opening.

20 Claims, 17 Drawing Sheets

(56) References Cited

U.S. PATENT DOCUMENTS

| | | |
|---|---|---|
| 8,151,492 B2* | 4/2012 | Rackiewicz ............. A43C 7/08 36/132 |
| 2001/0019758 A1 | 9/2001 | Hiraoka et al. |
| 2002/0050077 A1* | 5/2002 | Wang ....................... A43B 5/00 36/15 |
| 2003/0009907 A1 | 1/2003 | Schuver et al. |
| 2006/0112599 A1* | 6/2006 | Braynock ............ A43B 3/0094 36/137 |
| 2011/0010964 A1* | 1/2011 | Hardy .................... A43B 21/30 36/103 |
| 2011/0119963 A1* | 5/2011 | Braynock ............ A43B 3/0078 36/137 |
| 2013/0008051 A1* | 1/2013 | Meyer .................... A43B 23/07 36/87 |
| 2014/0109440 A1 | 4/2014 | McDowell et al. |
| 2015/0013187 A1 | 1/2015 | Taniguchi et al. |
| 2015/0216258 A1 | 8/2015 | Ueda et al. |
| 2015/0282565 A1 | 10/2015 | Kilgore |

OTHER PUBLICATIONS

International Search Report issued in PCT/JP2018/032119; dated Dec. 4, 2018.

* cited by examiner

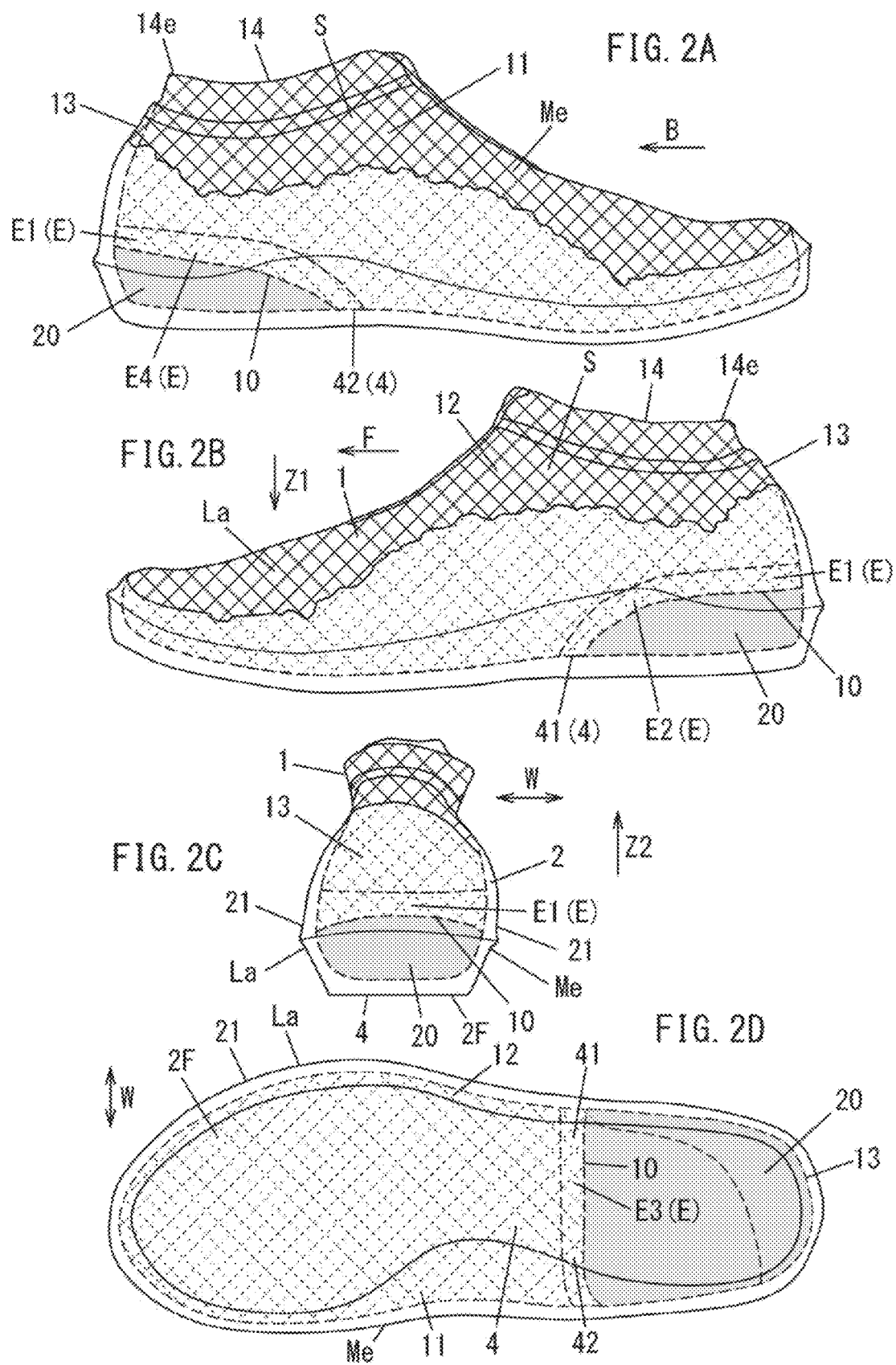

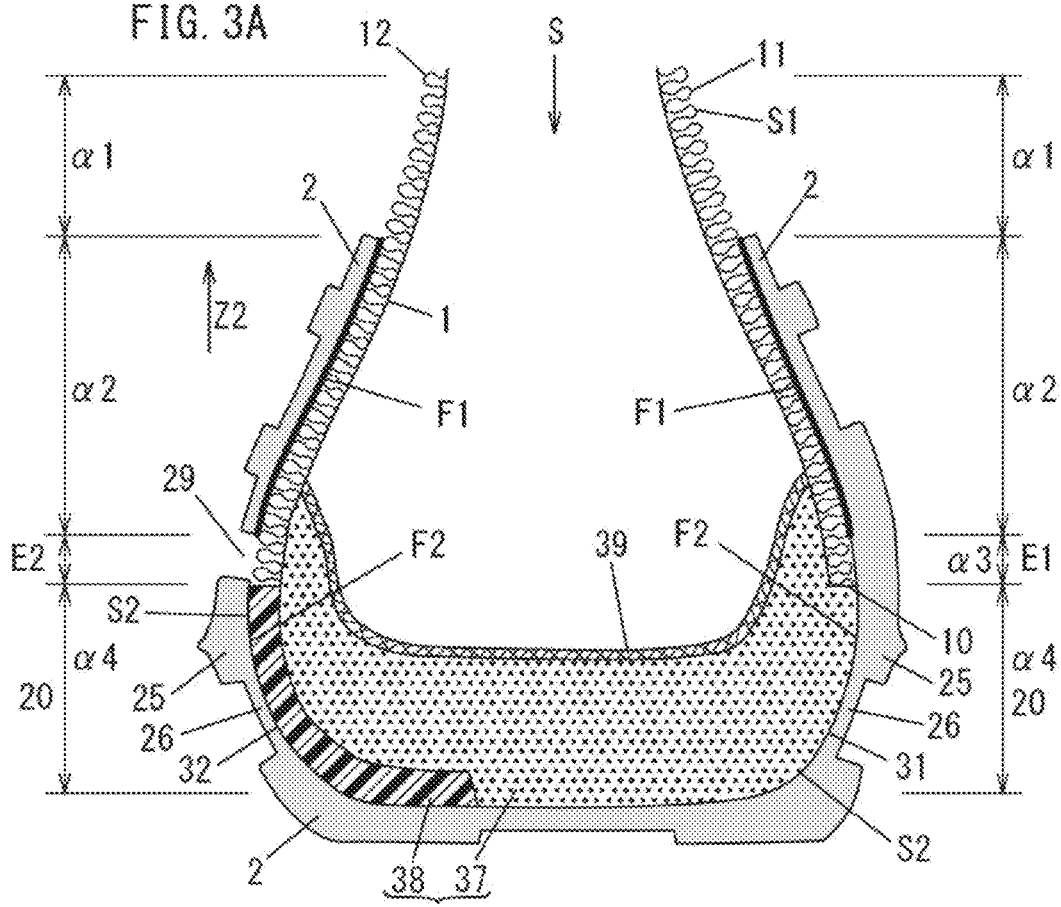
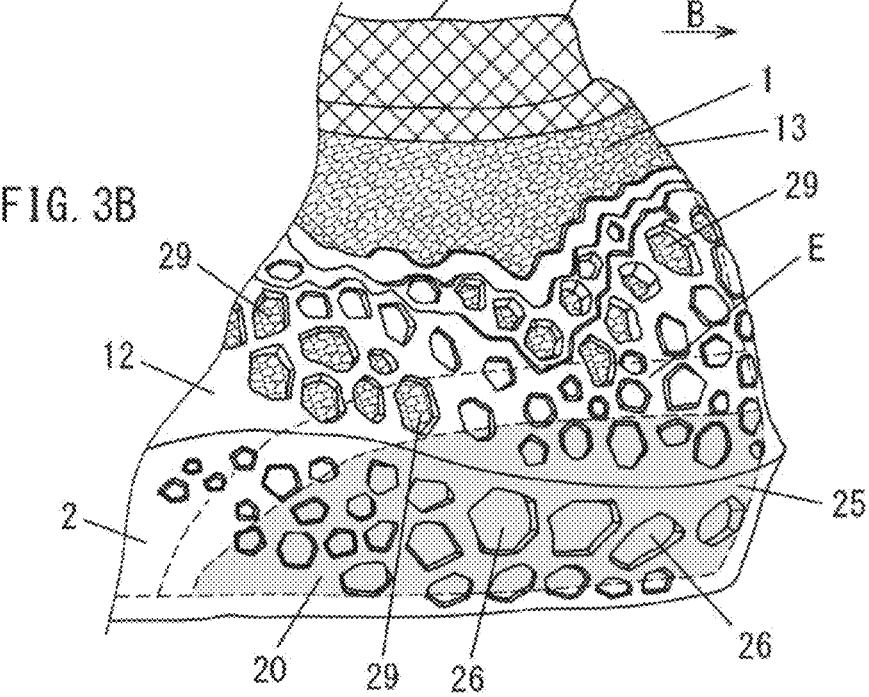

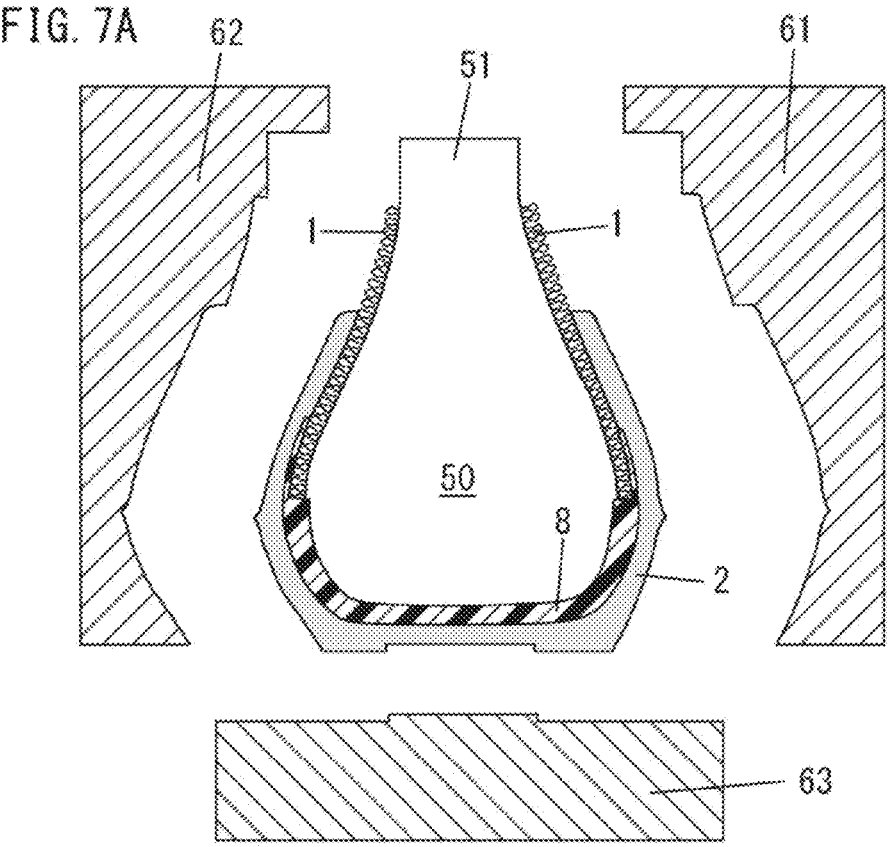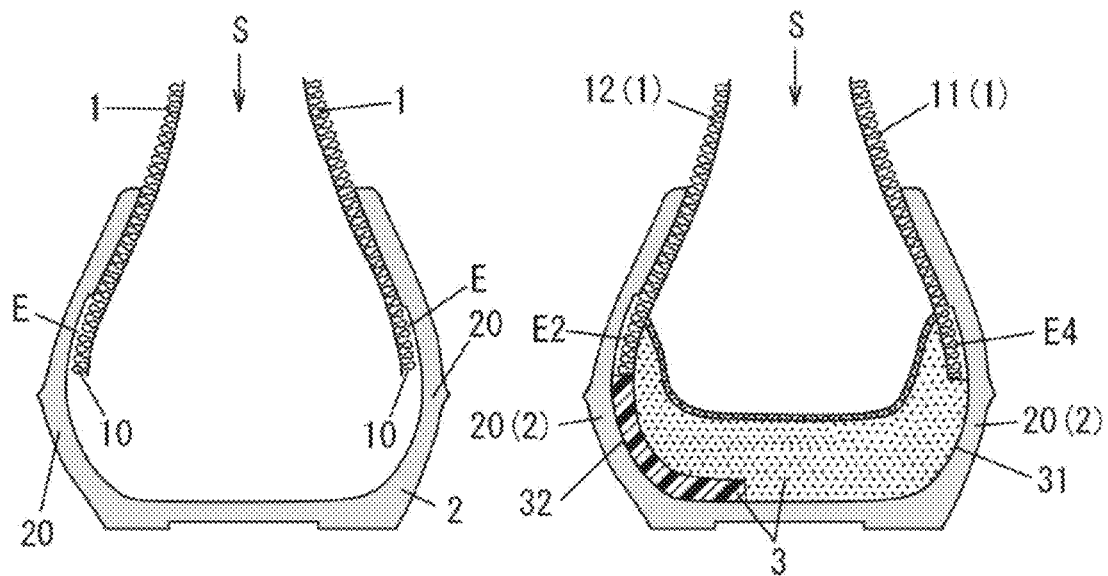

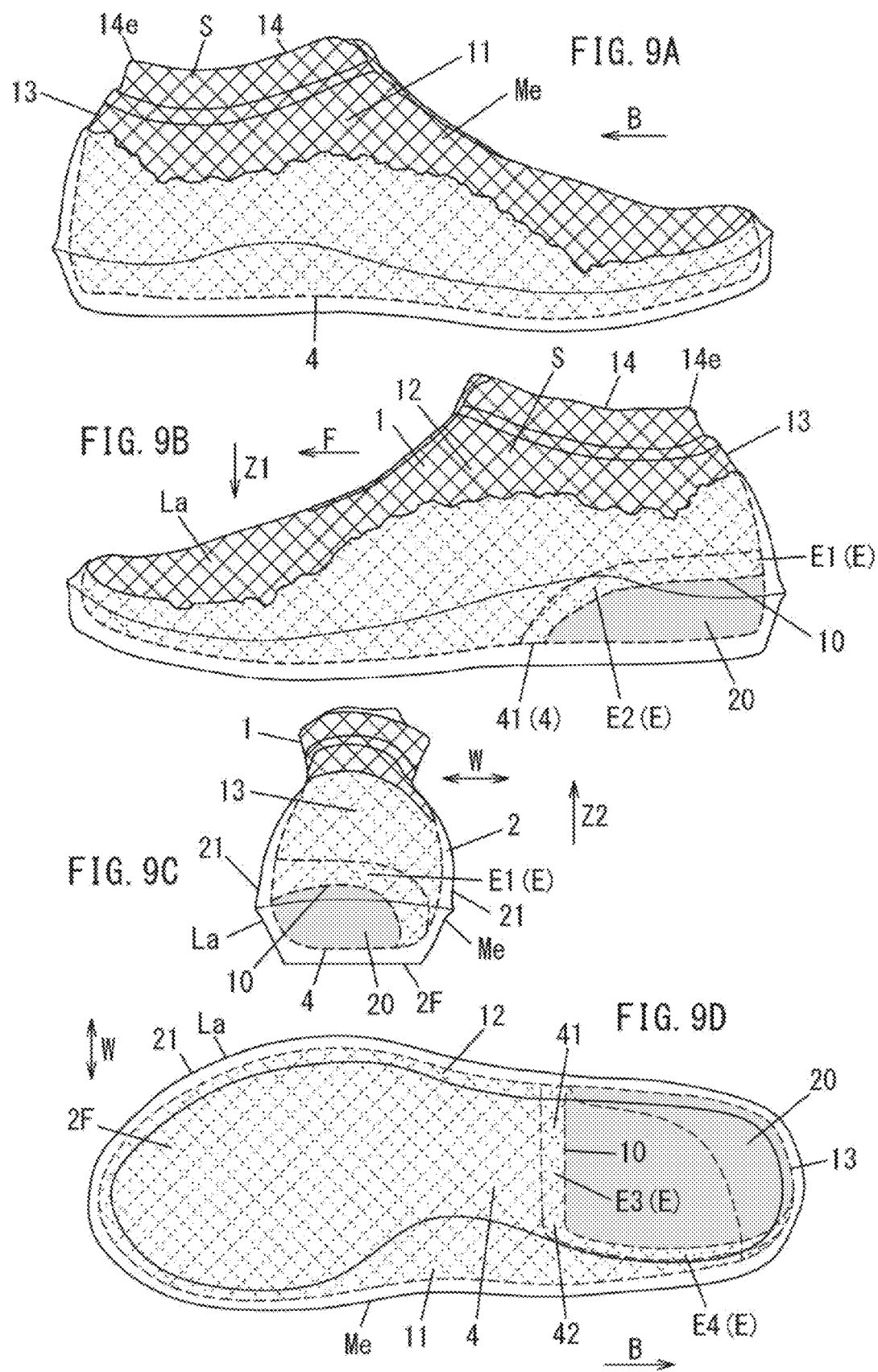

SHOE AND METHOD OF MANUFACTURING SHOE

TECHNICAL FIELD

The present invention relates to a shoe using a sock-like upper member and a method of manufacturing the shoe.

BACKGROUND ART

Parts of shoes are produced by machines. Meanwhile, in many cases, work of assembling the parts is generally done manually. Such work requires skill, thereby causing difficulty in maintaining quality as well as causing running costs to increase.

In response to this, molding a sole member made of thermoplastic resin integrally with a sock-like upper member has been suggested for manufacturing a shoe mechanically.

CITATION LIST

Patent Literature

First patent document: WO 2013/121578 A1 (front page)
Second patent document: U.S. Pat. No. 2,484,215
Third patent document: U.S. Pat. No. 9,675,130 B2 (front page)
Fourth patent document: JP 2000-152803 A

SUMMARY OF INVENTION

Each of the foregoing prior-art documents may be usable for producing shoes mechanically in large quantity. However, no efforts to improve functions or aesthetic properties of shoes can be found in these prior-art documents.

Thus, the present invention is intended to provide a configuration of a shoe and a method of manufacturing the shoe capable of improving a function and aesthetic properties as well as being available for mass production.

According to a first aspect of the present invention, a shoe includes:

an upper member 1 containing a knit fabric, a knit-like fabric, and/or a woven fabric as a primary member and forming a part of a side surface 11 on a medial foot section, a part of a side surface 12 on a lateral foot section, and a part of a back surface 13;

an outsole member 2 made of thermoplastic resin and forming a bottom portion 24 including a ground contact surface (a tread surface) 2F, and a peripheral portion 21 attached at least partially to respective lower parts of the side surfaces 11 and 12 on the medial side and on the lateral side and a lower part of the back surface 13 of the upper member 1 and connected to the bottom portion 24; and a sock liner (a sock lining) 3 inserted in interior space S defined by the upper member 1 and the outsole member 2, wherein the upper member 1 defines an opening 10 at which at least a part of the side surface 12 on the lateral foot section is cut, the outsole member 2 includes a window portion 20 covering the opening 10, and the window portion 20 is made of a semi-transparent material that makes at least a part of a side surface 32 on the lateral foot section of the sock liner 3 in the interior space S visible through the window portion 20 covering the opening 10.

According to a second aspect of the present invention, a shoe includes;

a sock-like upper member 1 containing a knit fabric, a knit-like fabric, and/or a woven fabric as a primary member and including a bottom surface 4, a side surface 11 on a medial foot section, a side surface 12 on a lateral foot section, and a back surface 13;

an outsole member 2 made of thermoplastic resin and forming a bottom portion 24 attached to the bottom surface 4 and including a contact surface 2F, and a peripheral portion 21 attached to respective lower parts of the side surfaces 11 and 12 and a lower part of the back surface 13 of the upper member 1 and connected to the bottom portion 24; and a sock liner 3 inserted in interior space S defined by the upper member 1 and the outsole member 2, wherein the upper member 1 includes an annular edge E that defines an opening 10 at which at least a part of the side surface 12 on the lateral foot section, a part of the back surface 13, and a part of the bottom surface 4 are missing (removed, or cut), the annular edge E includes a first edge E1, a second edge E2, a third edge E3, and a fourth edge E4 forming a loop, the first edge E1 extending on the back surface 13 in a transverse direction, the second edge E2 starting from the back surface 13 and extending toward a front direction F and a downward direction Z1 along the side surface 12 on the lateral foot section and on the side surface 12 on the lateral foot section to reach a first position 41 of the bottom surface 4, the third edge E3 extending on the bottom surface 4 from the first position 41 of the bottom surface 4 medially (inward) in a width direction W to a second position 42 of the bottom surface 4, the fourth edge E4 starting from the second position 42 of the bottom surface 4 and extending on the side surface 11 on the medial foot section or on the bottom surface 4 toward a rear direction B to reach the back surface 13, the outsole member 2 extends from the bottom portion 24 along the back surface 13 and the side surfaces 11 and 12 of the upper member 1 further toward an upward direction Z2 than the annular edge E, and includes a window portion 20 covering the opening 10, and the window portion 20 is made of a semi-transparent material that makes at least a part of a side surface 32 on the lateral foot section, a part of a back surface 33, and a part of a bottom surface 34 of the sock liner 3 in the interior space S visible through the window portion 20 covering the opening 10.

According to a third aspect of the present invention, a shoe includes:

a sock-like upper member 1 containing a knit fabric, a knit-like fabric, and/or a woven fabric as a primary member and including a bottom surface 4, a side surface 11 on a medial foot section, a side surface 12 on a lateral foot section, and a back surface 13;

an outsole member 2 made of thermoplastic resin and forming a bottom portion 24 attached to the bottom surface 4 and including a contact surface 2F, and a peripheral portion 21 attached to respective lower parts of the side surfaces 11 and 12 of the upper member 1 and connected to the bottom portion 24; and a sock liner 3 inserted in interior space S defined by the upper member 1 and the outsole member 2, wherein the upper member 1 includes an annular edge E that defines an opening 10 at which at least a part of the side surface 12 on the lateral foot section and a part of the bottom surface 4 are missing (removed, or cut), the annular edge E includes a first edge E1, a second edge E2, a third edge E3, and a fourth edge E4 forming a loop, the first edge E1 extending on the bottom surface 4 in a transverse direction from a third position 43 of the bottom surface 4 to a fourth position 44 of the bottom surface on the side of the lateral foot section, the second edge E2 rising from the fourth position 44 toward the side surface 12 on the lateral foot section, extending along the side surface 12 on the lateral foot section toward a front direction F on the side surface 12 on the lateral foot section, and extending further from the side surface 12 on the lateral foot section downward to a fifth position 45 of the bottom surface 4 on the side of the lateral foot section, the third edge E3 starting from the fifth position 45 of the bottom surface 4 and extending on the bottom surface 4 toward the medial foot section in a width direction W to reach a sixth position 46 of the bottom surface 4, the fourth edge E4 starting from the sixth position 46 of the bottom surface 4 and extending on the side surface 11 on the medial foot section or on the bottom surface 4 toward a rear direction B to reach the third position 43 of the bottom surface 4, the outsole member 2 extends from the bottom portion 24 along the side surfaces 11 and 12 of the upper member 1 further toward an upward direction Z2 than the annular edge E, and includes a window portion 20 covering the opening 10, and the window portion 20 is made of a semi-transparent material that makes at least a part of a side surface 32 on the lateral foot section and a part of a bottom surface 34 of the sock liner 3 in the interior space S visible through the window portion 20 covering the opening 10.

In the foregoing shoes, the window portion 20 is made of a semi-transparent material, and this makes at least the side surface 32 on the lateral foot section and further makes the bottom surface 34, etc. of the sock liner 3 in the interior space S visible through the semi-transparent window portion 20. The sock liner 3 is inserted in the interior space S and thus can be changed at the time of or after purchase of shoes. This makes it possible to obtain shoes colored in a manner conforming to the preference or clothing of a wearer.

A through hole may be provided at the window portion 20 to make a part of the sock liner 3 in the interior space S visible through the through hole. The through hole may have various types of shapes. For example, the through hole may be formed into a polygonal shape, a chevron shape, or a lattice shape. This will realize weight reduction of the outsole member 2 and improve air permeability.

In the present invention, making the color tone of the sock liner 3 inserted in the interior space S recognizable from outside is good enough as a degree of transparency of the semi-transparent material forming the outsole member. Even if there is resin seen to be transparent at a glance, no resin can be completely transparent. In the present invention, being semi-transparent means semi-transparency approximate to such transparency.

For example, the transparency of the semi-transparent material forming the outsole member may be higher than that of the sock liner. The outsole member may be semi-transparent as a whole. Generally, the outsole member is given high transparency by reducing a pigment dose. As the thermoplastic resin used for forming the semi-transparent outsole member, polyurethane, nylon, styrene-ethylene-butylene-styrene block copolymer (SEBS), and EVA are applicable, for example.

The transparency mentioned herein is an index indicating to which degree a substance or a material is transparent. Light transmittance may be used for expressing a degree to which the substance or material is transparent, for example. The transparency can be measured using a haze meter, for example. More specifically, a specimen is cut out from the outsole member, and remolded, if necessary. Then, the transparency of the specimen may be measured on the basis of JIS K 7136 (Plastics—Determination of haze for transparent materials) as a reference.

In the present invention, a term such as a transverse direction or a rear direction has meaning as a directly transverse direction or a directly rear direction and also has a meaning as an obliquely transverse direction or an obliquely rear direction.

Preferably, the opening 10 extends continuously at least from the side surface 12 on the lateral foot section of the upper member 1 to the bottom surface 4 of the upper member 1.

If the opening 10 is provided further on the bottom surface 4 of the upper member 1, the sock liner 3 can be made thicker at the opening 10 by a corresponding thickness of the bottom surface 4 of the upper member 1. Thus, the sock liner 3 is expected to improve shock absorbency.

The opening 10 resulting from the missing (removal, or cut) means the absence of a portion ought to be present by nature. Thus, the opening 10 does not mean a tiny opening occurring between threads or fibers forming a knit fabric, for example, but it means a large opening giving the impression of having been hollowed out.

The opening 10 resulting from the missing (removal, or cut) may be formed in advance into a shape such as a mouth at a wearing opening during knitting of the upper member 1. Alternatively, the opening 10 may be formed by cutting out a part of the upper member after the upper member is formed once.

The sock-like upper member 1 includes a tubular member having a mouth formed at least at a wearing opening. Meanwhile, the shape of the upper member 1 means that, as long as the upper member 1 is mountable on a last, the upper member 1 can be opened at a portion other than a wearing opening or the opening 10, such as a part of a tiptoe or an arch portion. The sock-like shape means a shape that can cover at least a part of the instep, a part of the back surface, and a part of the bottom surface of a foot and can be placed over a last. The sock-like shape includes a shape with a hole passing through a shoe sole or a slit-like opening to be covered by a tongue later.

In the present invention, the upper member 1 contains a knit fabric, a knit-like fabric, and/or a woven fabric as a primary member. The upper member 1 may also contain synthetic leather or a resin sheet, or may be a member containing two or more of these types of materials. For example, a knit and woven fabric or a warp knit fabric is applicable.

The "primary member" means one of members forming the upper member 1 that accounts for a greatest proportion.

If the sock-like upper member 1 is a knit fabric or a woven fabric, the upper member 1 may be produced by a well-known knitting machine or weaving machine, or may be formed into a sock-like shape by sewing up a knit fabric or a woven fabric. The knit-like fabric means a fabric having a macroscopic-stitch fabric structure, i.e., a lattice structure.

If the upper member 1 is made of one, or two or more of a knit fabric, a knit-like fabric, and/or a woven fabric (these will collectively be called "knit fabrics"), or if the upper member 1 contains one, or two or more of the knit fabrics as a primary member, the outsole member 2 made of thermoplastic resin is fixedly attached to the upper member 1 by an anchor effect. Namely, a part of the resin of the outsole member 2 welded to the upper member 1 penetrates into the reticulated structure of the upper member 1. This produces the anchor effect to integrate the outsole member 2 with the upper member 1.

"The outsole member is made of thermoplastic resin" means that the outsole member contains a thermoplastic resin component as a main component. This makes it possible to mold the inner surface of the outsole member smoothly at the window portion. This smooth inner surface of the outsole member functions like a windowpane to cause light to pass therethrough without causing irregular reflection of the light. This makes a surface of the sock liner in the interior space S visible through the window portion.

"Being contained as a main component" means that at least the thermoplastic resin component is contained in larger quantity (larger weight) than the other resin component. To achieve an effect such as the smoothing of the inner surface, the weight ratio of the thermoplastic resin component as the main component is preferably from 50 to 100% by weight of the resin components as a whole forming the outsole member, more preferably, from 80 to 100% by weight, still more preferably, from 90 to 100% by weight, and most preferably, 100% by weight.

BRIEF DESCRIPTION OF DRAWINGS

FIGS. 2A, 2B, 2C, and 2D are a medial view, a lateral view, a back view, and a bottom view respectively of the shoe.

FIGS. 3A and 3B are a cross-sectional view and a lateral view respectively of a rearfoot portion of the shoe.

FIGS. 7A, 7B, and 7C are sectional views each showing a step of a method of manufacturing the shoe performed after the molding steps.

FIGS. 9A, 9B, 9C, and 9D are a medial view, a lateral view, a back view, and a bottom view respectively of the shoe.

In FIGS. 1A to 2D, 3B, 8B, 9A to 9D, 10B, 16A to 16C, 17B, and 17C, to make the configuration of a shoe easy to understand, a portion of an outsole member (window portion) covering an opening of an upper member is colored in gray. In FIGS. 3A, 6B to 7C, 10A, and 12B, to facilitate understanding of the drawings, a portion corresponding to the outsole member or molten resin is colored in gray.

In FIGS. 1A to 2D, 4C, 4D, 8A to 9D, 11C, 11D, 13B, 14A, 14C, and 16A to 17C, a portion corresponding to the upper member is given a lattice pattern. In these figures, the lattice pattern at an exposed portion of the upper member is drawn with solid lines and the lattice pattern at a portion of the upper member covered by the outsole member is drawn with dashed lines.

In FIGS. 3A and 10A, a portion having a welded structure (a welding construction) formed by welding and attaching the outsole member to a surface of the upper member is indicated by bold solid lines.

In FIGS. 3B and 10B, an exposed surface of a knit fabric forming a part of the upper member is given irregularly repeated patterns.

In FIGS. 3A, 7C, and 10A, a portion of a sock liner made of a foamed body is given a dotted pattern, and a portion of the sock liner made of a jelly-like non-foamed body is given hatching representing resin.

DESCRIPTION OF EMBODIMENTS

Figure 1A:
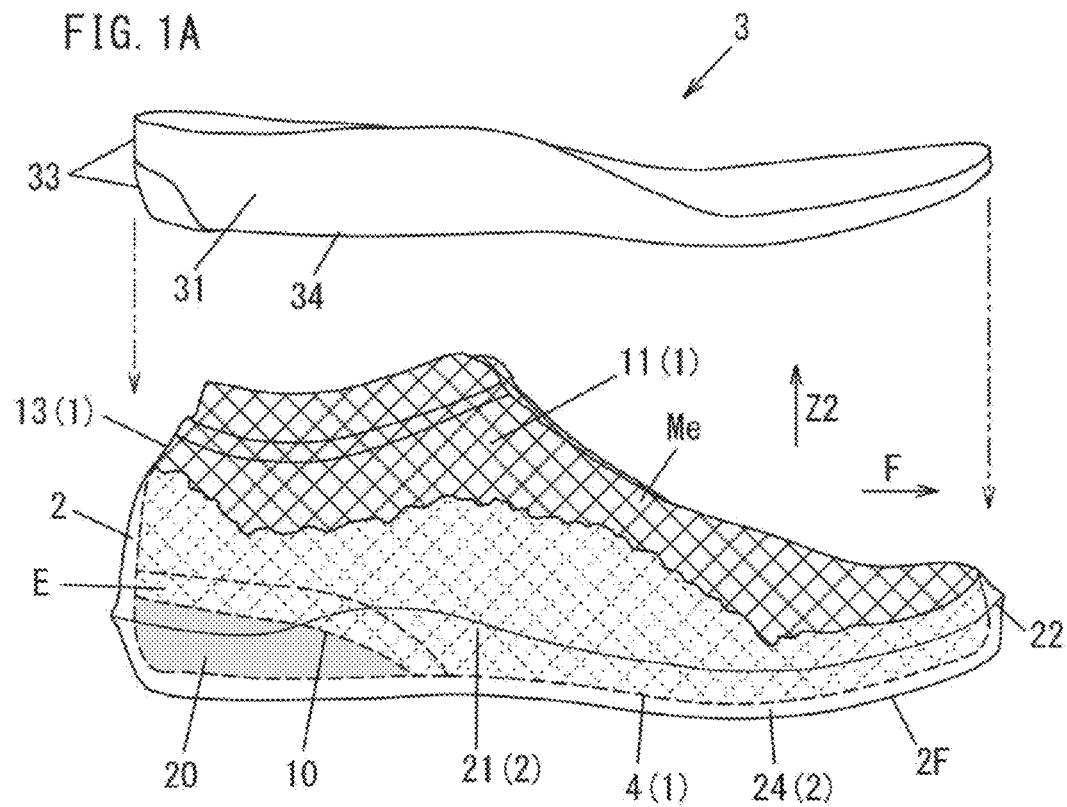
FIGS. 1A and 1B are an exploded medial view and an exploded lateral view respectively of a shoe each relating to a first embodiment of the present invention and showing the shoe from which a sock liner is detached.

Preferably, the upper member 1 includes an annular edge E that defines the opening 10 at which at least a part of the side surface 12 on the lateral foot section of the upper member 1 and a part of the bottom surface 4 of the upper member 1 are missing (removed, or cut), the outsole member 2 extends further toward a front direction F and an upward direction Z2 than the annular edge E, and the outsole member 2 penetrates into an outer surface of the upper member 1 in a portion of the upper member 1 other than the annular edge E to form a welded structure in which the outsole member 2 is anchored, thereby attaching the outsole member 2 to the upper member 1.

If the outsole member 2 is attached to the upper member 1 by the welded structure, insert-molding of the upper member 1 allows production of shoes mechanically in large quantity.

In the welded structure in which the outsole member 2 is anchored, the resin of the outsole member 2 penetrates like roots of a tree into tiny projections and recesses at the surface of the upper member 1 containing the knit fabrics as a primary member and is cured to achieve what is called the anchor effect, and this will increase the power of connecting the outsole member 2 and the upper member 1.

Preferably, the inner surface of the window portion 20 of the outsole member 2 has lower surface roughness than an interface F1 of the outsole member 2 attached to the upper member 1 with the upper member 1.

In a portion where the welded structure is formed, surfaces of the knit fabrics are given tiny projections and recesses, so that extraneous light having entered this portion is reflected irregularly on the surfaces of the knit fabrics. Further, a resin surface of the outsole member (interface F1) penetrating into the surfaces of the knit fabrics is also given tiny projections and recesses. When the irregularly reflected light passes through the outsole member 2, the light is reflected irregularly on the resin interface F1 and refracted irregularly in various directions. Thus, even if the resin of the outsole member 2 has high transparency, this produces a color tone that gives the resin of the outsole member 2 the impression of being non-transparent.

In this way, the semi-transparent outsole member 1 of a single type can achieve the color tone of the surface of the upper member 1 uncovered by the outsole member 2 and the color tone of the portion where the welded structure is formed, as well as the color tone of the sock liner 3 visible through the window portion 20.

The state of the interface F1 of the outsole member 2 may be checked easily using an illuminator-equipped microscope (magnifier) or a microscope, for example.

Preferably, the lightness of at least a part of an outer surface S3 of the sock liner 3 arranged at the window portion 20 is higher than the lightness of at least a part of an outer surface S1 of the upper member 1.

The lightness mentioned herein means a degree of color brightness. The lightness is determined on the basis of a color with substantially no color shade such as black, gray, or white. Generally, a value is 9.5 for white and 1 for black. The lightness will be checked visually on the basis of a monochrome digital photograph.

If the lightness of the outer surface S3 of the sock liner 3 is high, the quantity of reflected light reflected on the sock liner 3 is increased, and this will make the color tone, etc. of the sock liner 3 visible more easily through the window portion 20.

The outer surface S1 of the upper member 1 may have different lightness from at least a part of the outer surface S3 of the sock liner 3 arranged at the window portion 20.

For example, the lightness of the outer surface S3 of the sock liner 3 may partially be lower than the lightness of the outer surface S1 of the upper member 1. More specifically, if the outer surface S3 of the sock liner 3 is given a logo or a pattern in a dark color, the lightness of such a logo or a pattern may be lower than the lightness of the outer surface S1 of the upper member 1. In this case, color contrast at the outer surface S3 of the sock liner 3 will be intensified to improve aesthetic properties.

Preferably, a contact state is formed at the annular edge E in which the outer surface of the upper member 1 contacts at least a part of the outsole member 2 without being attached to the outsole member 2.

In this case, the inner surface of the outsole member 2 can be molded smoothly at the annular edge E in the contact state. In this case, the outsole member 2 at the annular edge E is given a different color tone from the outsole member 2 attached to the upper member 1. This makes it possible to provide a wider variety of aesthetic properties.

Preferably, in a side view of the shoe, the upper member 1 is seen-through more easily at a portion of the outsole member 2 in the state of contacting the upper member 1 than at a portion of the outsole member 2 attached to the upper member 1 by the welded structure.

Surface roughness is lower at a portion corresponding to the inner surface F2 of the outsole member 2 in the state of contacting the upper member 1 than at the interface F1 of the outsole member 2 attached by the welded structure to the upper member 1 with the upper member 1. For this reason, in a side view of the shoe, the upper member 1 is seen-through more easily at the portion of the outsole member 2 in the state of contacting the upper member 1 than at the portion of the outsole member 2 attached to the upper member 1 by the welded structure.

In this case, the pattern of the upper member 1 is visible through the outsole member 2, making it possible to provide a wider variety of aesthetic properties.

Preferably, the opening 10 extends continuously at least from the side surface 12 on the lateral foot section and the bottom surface 4 of the upper member 1 to the back surface 13.

In this case, the window portion 20 extends continuously to the back surface 13, so that a wide variety of aesthetic properties can also be provided in the back surface 13.

Preferably, the sock liner 3 has a multilayered structure of at least two layers or more, and a part of the sock liner 3 having the multilayered structure is visible through the window portion 20.

In this case, a surface of the sock liner 3 having the multilayered structure can be viewed through the window portion 20, so that a wider variety of aesthetic properties can be provided.

Preferably, the window portion 20 of the outsole member 2 at least on the side surface 12 on the lateral foot section is provided with a thick portion 25 and a thin portion 26 thinner than the thick portion 25.

In this case, as a result of a difference in thickness, the thick portion 25 and the thin portion 26 differ from each other in transparency, even if the thick portion 25 and the thin portion 26 are made of the same resin. This makes a further difference in color tone of the sock liner 3 between the thick portion 25 and the thin portion 26 recognized through the window portion 20.

The thick portion 25 and the thin portion 26 can be formed into a hexagonal shape, a circular shape, or various types of other shapes.

A preferable method of manufacturing the shoe includes:

a mounting step of mounting (fitting) the upper member 1 defining the opening 10 on a last portion 52 of a core 50 including the last portion 52;

a loading step of loading the core 50 in between a plurality of outer molds 61, 62 meshed with each other in a width direction W of the shoe;

a step of clamping the outer molds 61, 62;

a step of supplying molten resin 71 to become the outsole member 2 between the outer molds 61, 62 and the upper member 1;

a step of curing the molten resin 71 to form the outsole member 2 integrally with the upper member 1;

a step of opening the outer molds 61, 62; and a step of engaging a resin part 8 for closing the opening 10 of the upper member 1 with the core 50 before the loading step of loading the core.

More preferably, the resin part 8 is made of a different resin from the outsole member 2, and the method further includes a step of removing the resin part 8 after the mold opening step.

Engaging the resin part 8 with the core 50 during manufacture makes it possible to prevent attachment of the molten resin 71 to a surface of a last as the core 50. This facilitates work of demolding.

The resin part 8 is made of a resin material not to be welded to the molten resin 71 to become the outsole member 2, so that the resin part 8 can be removed from the shoe after the mold opening. Such resin can be polypropylene or polyethylene, for example.

Preferably, the engaging step is performed before the loading step of loading the core 50 and after the mounting step of mounting the upper member 1.

In this case, the outer periphery 80 of the resin part 8 overlaps a surface of the upper member 1 at a peripheral edge of the opening 10 of the upper member 1, thereby preventing the molten resin 71 from penetrating in between the inner surface of the upper member 1 and the outer surface of the last at the overlapping portion. This achieves effects in terms of reducing unintentional extension of the molten resin 71 and increasing injection pressure, etc., thereby improving molding properties significantly.

In the manufacturing method, the occurrence of seeping or a flash of resin can be reduced by setting a predetermined range for a value determined by dividing the viscosity of the molten resin 71 to become the outsole member by the void content of the upper member.

The occurrence of the foregoing seeping or flash can be reduced by pressing the upper member with the molds to an extent that the upper member can no longer be pressed due to the pressure of the molten resin 71.

Any feature illustrated and/or depicted in conjunction with one of the aforementioned aspects or the following embodiments may be used in the same or similar form in one or more of the other aspects or other embodiments, and/or may be used in combination with, or in place of, any feature of the other aspects or embodiments.

Embodiments

The present invention will be understood more clearly from the following description of preferred embodiments taken in conjunction with the accompanying drawings. Note however that the embodiments and the drawings are merely illustrative and should not be taken to define the scope of the present invention. The scope of the present invention shall be defined only by the appended claims. In the accompanying drawings, like reference numerals denote like components throughout the plurality of figures.

Embodiments of the present invention will be described below by referring to the drawings.

FIGS. 1A to 7 show a first embodiment.

Figure 1B:
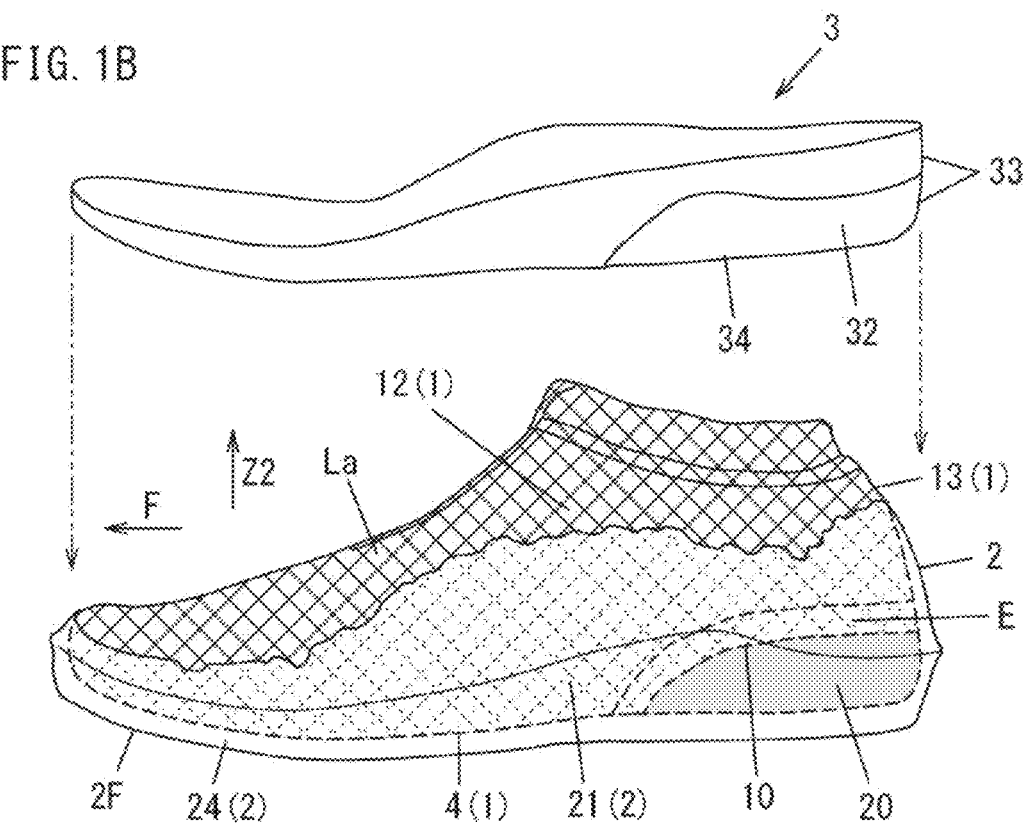

As shown in FIGS. 1A to 3B, a shoe in these drawings is configured using an upper member 1, an outsole member 2, and a sock liner 3 in FIGS. 1A and 1B.

In this embodiment, the upper member 1 includes a side surface 11 covering a medial foot section Me of a foot in FIG. 2A, a side surface 12 covering a lateral foot section La in FIG. 2B, a back surface 13 in FIG. 2C, and a bottom surface 4 in FIG. 2D covering a sole. The bottom surface 4 and the both side surfaces 11 and 12 may be sewed together. On the back surface 13, the upper member 1 may be sewed up at a posterior end, for example.

The upper member 1 is formed into a sock-like shape using a knit fabric, a knit-like fabric, and a woven fabric. The upper member 1 includes a wearing opening 14 for insertion of a foot into interior space S.

On the both side surfaces 11 and 12 and the back surface 13, the upper member 1 may be composed of a stack of two layers including a non-stretchy woven fabric and a stretchy knit fabric, for example. On the bottom surface 4, the upper member 1 is made of a woven fabric in many cases.

In the present invention, the back surface 13 of the upper member 1 means a portion of the upper member 1 closer to a rear direction B than a posterior end 14e of the wearing opening 14 in FIG. 3B.

In FIGS. 2A to 2D, the outsole member 2 is attached to a part of an outer surface of the upper member 1. The outsole member 2 is made of thermoplastic resin such as polyurethane, for example. Two loop-like solid lines shown FIG. 2D include an inner loop-like solid line indicating a (ground) contact surface 2F, and an outer loop-like solid line indicating the outline of the outsole member 2.

In FIGS. 1A and 1B, the outsole member 2 forms a bottom portion 24 attached to the bottom surface 4 and including the contact surface 2F, and forms a peripheral portion 21 attached to lower parts of the both side surfaces 11 and 12 and a lower part of the back surface 13 of the upper member 1 and connected to the bottom portion 24. As shown in FIG. 3A, the sock liner 3 is inserted in the interior space S defined by the upper member 1 and the outsole member 2.

In FIGS. 2A to 2D, the upper member 1 includes an opening 10 at which a part of the side surface 11 on the medial foot section Me, a part of the side surface 12 on the lateral foot section La, a part of the back surface 13, and a part of the bottom surface 4 are missing (cut, or removed) so as to give the impression of having been hollowed out. The opening 10 is defined by an annular edge E of the upper member 1. The annular edge E includes a first edge E1 in FIG. 2C, a second edge E2 in FIG. 2B, a third edge E3 in FIG. 2D, and a fourth edge E4 in FIG. 2A that are connected to each other in the following manner to form a loop. These edges E1 to E4 are strip-like portions surrounded by two dashed lines in FIGS. 2A to 2D.

The first edge E1 in FIG. 2C extends on the back surface 13 from the medial foot section Me toward the lateral foot section La in a transverse direction (width direction W) in such a manner as to go across the back surface 13. The second edge E2 in FIG. 2B connected to the first edge E1 starts from the back surface 13 and extends in a parabolic shape toward a front direction F and a downward direction Z1 along the side surface 12 on the lateral foot section La and on the side surface 12 on the lateral foot section La to reach a first position 41 of the bottom surface 4 on the side of the lateral foot section La. The third edge E3 in FIG. 2D connected to the second edge E2 extends on the bottom surface 4 from the first position 41 of the bottom surface 4 in the width direction W to a second position 42 of the bottom surface 4 on the side of the medial foot section Me in such a manner as to go across the bottom surface 4 in the width direction W. The fourth edge E4 in FIG. 2A connected to the third edge E3 starts from the second position 42 of the bottom surface 4, extends on the side surface 11 on the medial foot section Me toward the rear direction B to reach the back surface 13, and is connected to the first edge E1.

As shown in FIGS. 2A to 2D, the outsole member 2 extends from the bottom portion 24 along the back surface 13 and the side surfaces 11 and 12 of the upper member 1 further toward an upward direction Z2 than the annular edge E. The outsole member 2 includes a window portion 20 covering the opening 10. The anterior end of the window portion 20 may be arranged in front of the posterior end 14e of the wearing opening 14.

The outsole member 2 including the window portion 20 is made of a semi-transparent material consistent between all the portions. Thus, in this embodiment, each of both side surfaces 31 and 32, a back surface 33, and a bottom surface 34 of the sock liner 3 in FIGS. 1A and 1B is partially visible through the window portion 20 covering the opening 10. Further, as the need of what is called two-color molding is eliminated, the shoe is manufactured easily.

In FIG. 3A, the shoe includes an exposed region α1, a welded region α2, a non-welded region α3, and a window region α4. In the exposed region α1, the upper member 1 is exposed without being covered by the outsole member 2.

In FIGS. 1A, 1B, and 3A, the outsole member 2 extends further toward the front direction F and an upward direction Z2 than the annular edge E. In the welded region α2, the outsole member 2 penetrates into the outer surface of the upper member 1 in a portion of the upper member 1 other than the annular edge E to form a welded structure in which the outsole member 2 is anchored, thereby attaching the outsole member 2 to the upper member 1.

An inner surface F2 of the window portion 20 of the outsole member 2 in the window region α4 has lower surface roughness and is smoother than an interface F1 of the outsole member 2 attached by the foregoing welded structure in the welded region α2 to the upper member 1, the interface F1 being between the outsole member 2 and the upper member 1.

In the non-welded region α3 in FIG. 3A, namely, in each of the edges E1 to E4, a contact state is formed in which the outer surface of the upper member 1 contacts the outsole member 2 without being attached (welded) to the outsole member 2. In other words, in the annular edge E, the upper member 1 is sandwiched between the outsole member 2 and the sock liner 3 without being bonded to the outsole member 2.

Figure 15A:
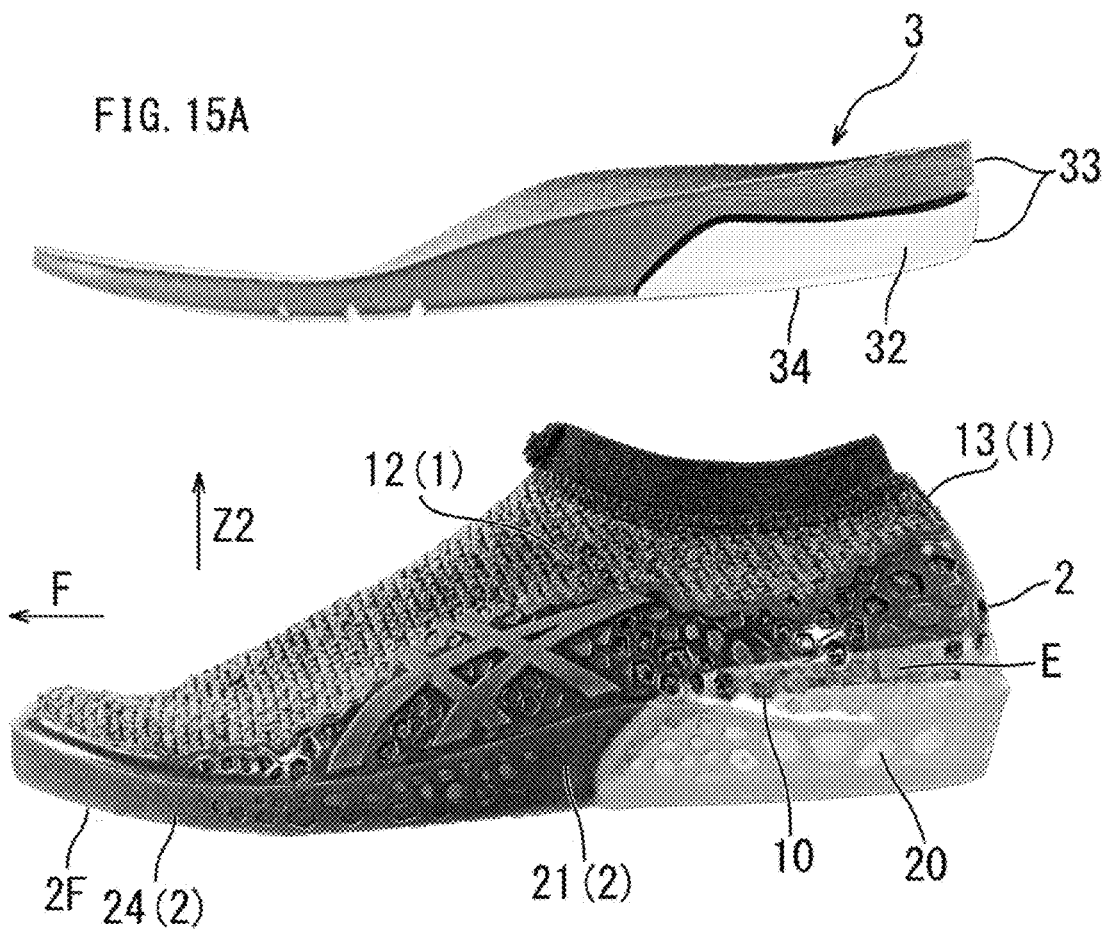
FIG. 15A is a reference medial view of a shoe in the form of a digital photograph showing an exploded medial side of the shoe from which a sock liner is detached.
Figure 15B:
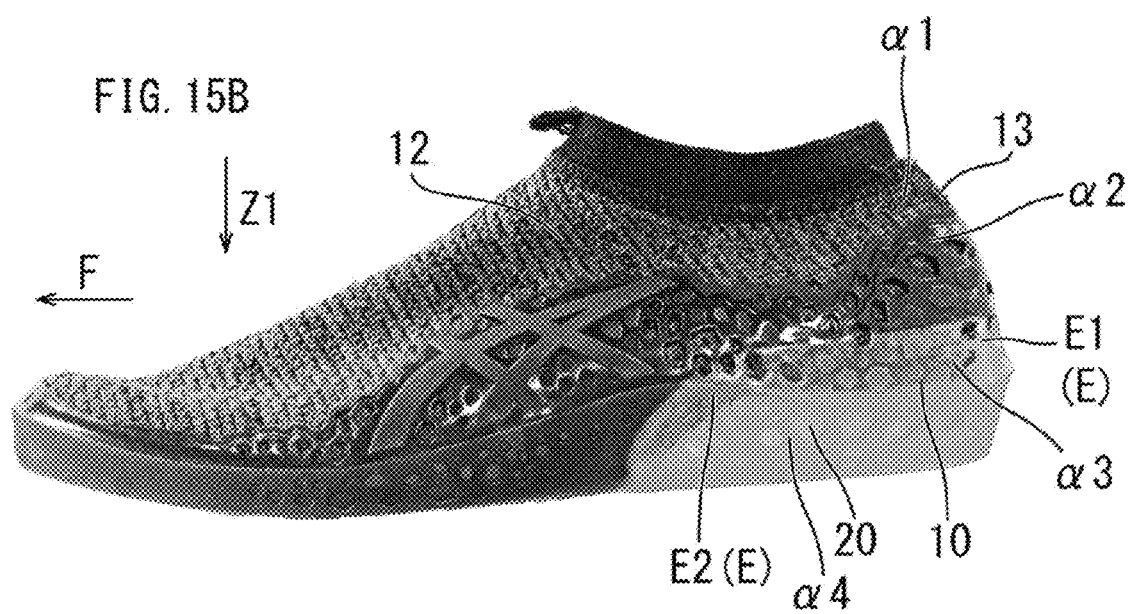
FIG. 15B is a reference medial view showing the medial side of the shoe in the form of a digital photograph.

As shown in FIGS. 15A and 15B, each of the regions α1 to α4 produces the following feeling. In the exposed region α1, the upper member 1 is exposed so the appearance of the upper member 1 can be sensed directly.

In the welded region α2 in FIG. 3A, surfaces of the foregoing knit fabrics are given tiny projections and recesses, so that extraneous light having entered the welded region α2 is reflected irregularly on the surfaces of the knit fabrics. Further, a resin surface of the outsole member 2 (interface F1) penetrating into the surfaces of the knit fabrics are also given tiny projections and recesses. When the irregularly reflected light passes through the outsole member 2, the light is reflected irregularly on the interface F1 and refracted irregularly in various directions. Thus, even if the resin of the outsole member 2 in FIG. 15B has high transparency, a metallic feeling is produced that gives the resin of the outsole member 2 the impression of being non-transparent.

In the edge E (E1) in FIG. 3A, namely, in the non-welded region α3, a contact state is formed in which an outer surface S1 of the upper member 1 contacts the outsole member 2 without being attached to the outsole member 2. Further, the inner surface F2 of the outsole member 2 is molded as a smooth surface. Thus, as shown in FIG. 15B, the upper member 1 can be seen through the outsole member 2 at the annular edge E to produce a completely different feeling from the welded region α2.

In the window region α4 in FIG. 3A, the window portion 20 is made of the semi-transparent outsole member 2 and the inner surface F2 of the window portion 20 is smooth. This makes the side surface 32 on the lateral foot section, the back surface 33, the bottom surface 34, etc. of the sock liner 3 in FIG. 15A visible through the semi-transparent window portion 20.

As shown in FIG. 15A, an outer surface S2 of the sock liner 3 (FIG. 3A) arranged at the window portion 20 has higher lightness than the outer surface S1 of the upper member 1 (FIG. 3A). This makes the quantity of reflected light reflected on the sock liner 3 in the window region α4 larger than that of reflected light reflected on the outer surface S1 of the upper member 1 in the welded region α2. This will make the sock liner 3 visible more easily in terms of color tone, etc. through the window portion 20.

In FIGS. 2B and 2D, the opening 10 extends continuously at least from the side surface 12 on the lateral foot section to the bottom surface 4 of the upper member 1. In FIGS. 2B to 2D, the opening 10 extends continuously from the side surface 12 on the lateral foot section and the bottom surface 4 to the back surface 13 of the upper member 1.

In FIG. 1B, the sock liner 3 has two layers and a part of the two-layered sock liner 3 is visible through the window portion 20. In FIG. 3A, the sock liner 3 includes a foamed layer 37 as a primary member made of thermoplastic resin such as EVA, for example. A jelly-like non-foamed layer 38 may be stacked in a lower layer at a rearfoot section. A fiber layer 39 may be stacked on the foamed layer 37.

The foamed layer 37 and the non-foamed layer 38 have outer surfaces differing from each other in luster and color. This allows representation of two color tones through the window portion 20.

In FIG. 3B, the window portion 20 of the outsole member 2 is provided with thick portions 25 and thin portions 26 thinner than the thick portions 25 formed on a side surface on the lateral foot section, for example. Through holes 29 in FIG. 3B may be formed in the welded region α2 and the non-welded region α3 in FIG. 3A to expose the upper member 1 partially. The through holes 29 may be formed at the window portion 20 to expose the sock liner 3 partially.

An exemplary method of manufacturing the shoe of the first embodiment will be described next by referring to FIGS. 4A to 7C. In the manufacturing method of this embodiment, a core 50, a resin part 8, and first to third outer molds 61 to 63 are prepared in advance. The outer mold may be divided into two, or four or more.

Figure 4A:
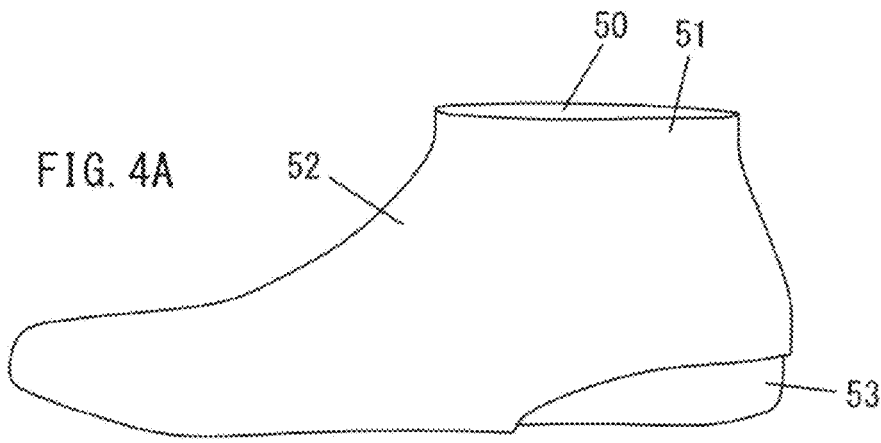
FIG. 4A is a perspective view showing a core (last)
Figure 4B:
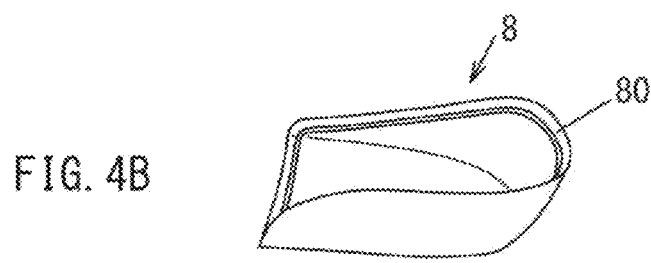
FIG. 4B is a perspective view showing a resin part.
Figure 4C:
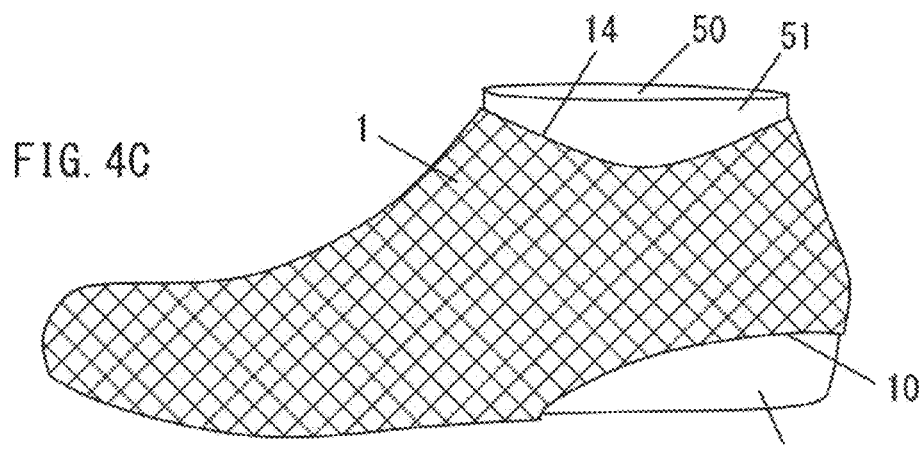
FIG. 4C is a perspective view showing the core on which an upper member is mounted.

The core 50 in FIG. 4A includes a core print 51 and a last portion 52, and is used for mounting (fitting) the sock-like upper member 1 in FIG. 4C on the last portion 52, the sock-like upper member 1 forming a part of an upper on the last portion 52. The core print 51 is held on the first and second outer molds 61 and 62 in FIG. 5B.

Figure 5A:
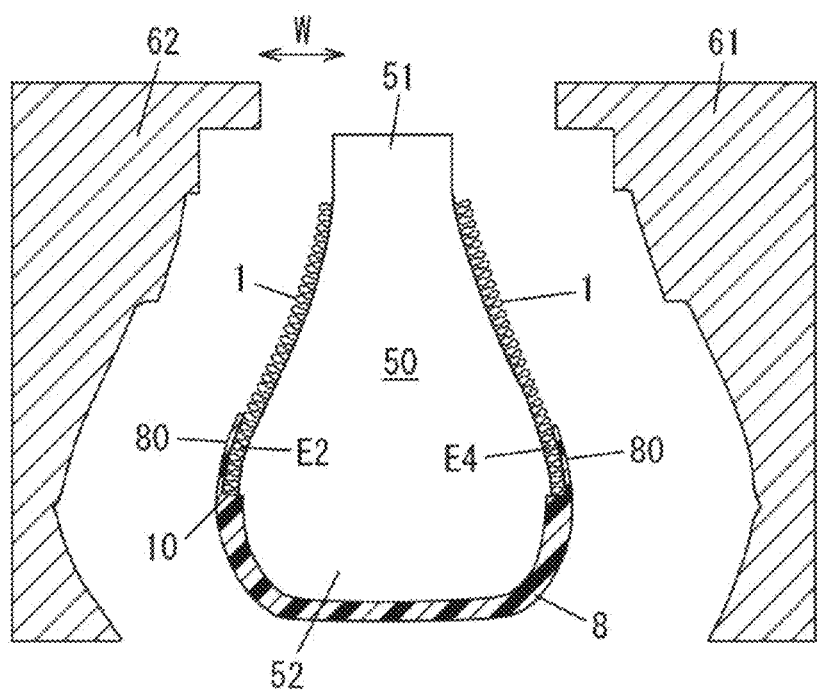
FIGS. 5A and 5B are sectional views of a mold, etc. each showing a molding step.

The first outer mold 61 and the second outer mold 62 in FIG. 5A are meshed with each other in the width direction W. The first and second outer molds 61 and 62 each have a large number of projections (not shown in the drawings) for forming the thin portions 26 and the through holes 29 (FIG. 3B).

Figure 5B:
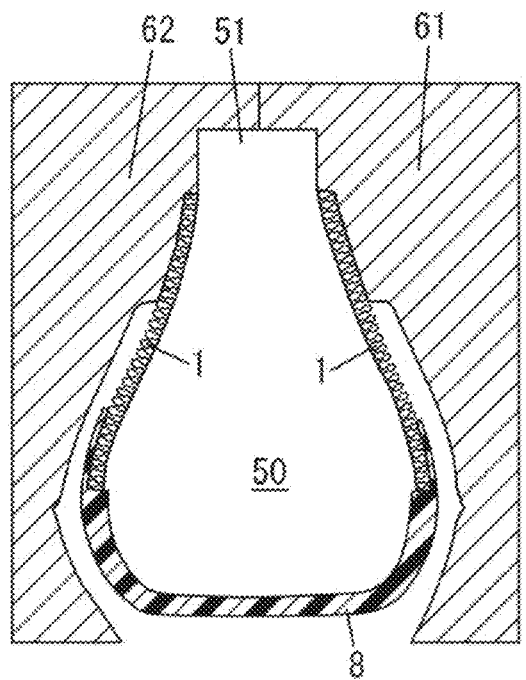

The third outer mold 63 in FIG. 5B faces a sole section of the last portion 52. The third outer mold 63 may have an elongated projection for forming a vertically-long groove, for example.

Figure 4D:
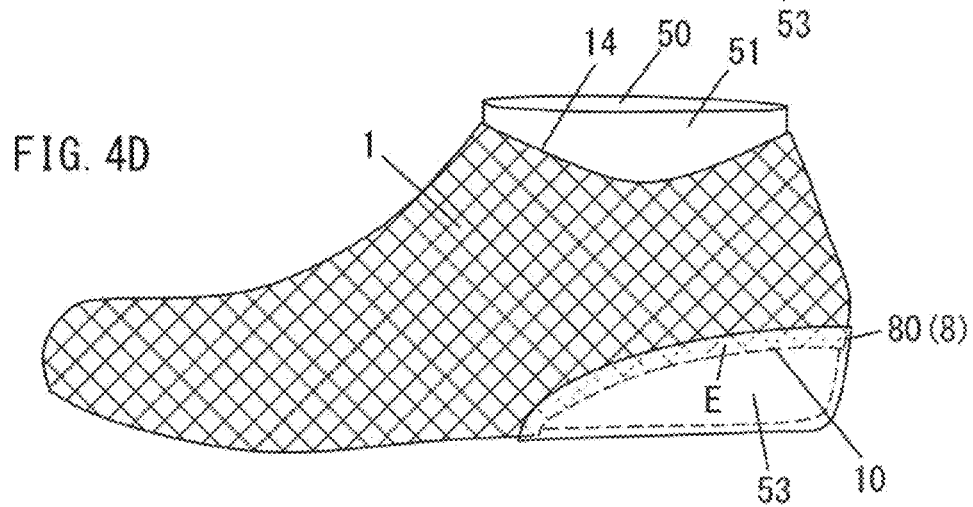
FIG. 4D is a perspective view showing a state in which the resin part is mounted on the core with the upper member.

The resin part 8 in FIG. 4B is made of polypropylene, for example, and is configured to be engaged with a heel part 53 of the core 50, as shown in FIG. 4D. More specifically, the shape of the heel part 53 of the core 50 is like a cut formed in a surface, as shown in FIG. 4A. Meanwhile, the resin part 8 of a scoop-like shape has a thin outer periphery 80 to achieve the engagement of the resin part 8 with the heel part 53 of the core 50, as shown in FIG. 4D.

Each manufacturing step will be described next.

First, the sock-like upper member 1 shown in FIG. 4C to form a part of an upper is prepared. As shown in FIG. 4C, the opening 10 is formed in advance at a heel part of the sock-like upper member 1. As described above, the opening 10 is formed in the upper member 1 to extend across the foregoing both side surfaces 11 and 12, back surface 13, and bottom surface 14 in FIGS. 2A to 2D.

The sock-like upper member 1 having the opening 10 is mounted on the last portion 52 of the core 50, the core 50 including the core print 51 and the last portion 52. During this mounting, the core print 51 projects from the wearing opening 14 of the upper member 1 on the core 50.

After mounting of the upper member 1 in FIG. 4C and before the loading step of loading the core 50 described later, an engaging step is performed in which the resin part 8 for closing the opening 10 of the upper member 1 is engaged with the core 50, as shown in FIG. 4D.

In the engaging step in FIG. 4D, the resin part 8 is engaged with the core 50 in such a manner that the resin part 8 is fitted to the heel part 53 of the last portion 52 and the outer periphery 80 of the resin part 8 overlaps the outer surface of the upper member 1 at the annular edge E as a loop of the upper member 1.

In this state, namely, with the upper member 1 mounted on the core 50 and the resin part 8 engaged with the core 50, the core 50 is loaded into the outer molds 61 to 63 in FIG. 5A. The core 50 may be supported by the outer molds 61 to 63 or may be supported by an additional different mold.

Figure 6A:
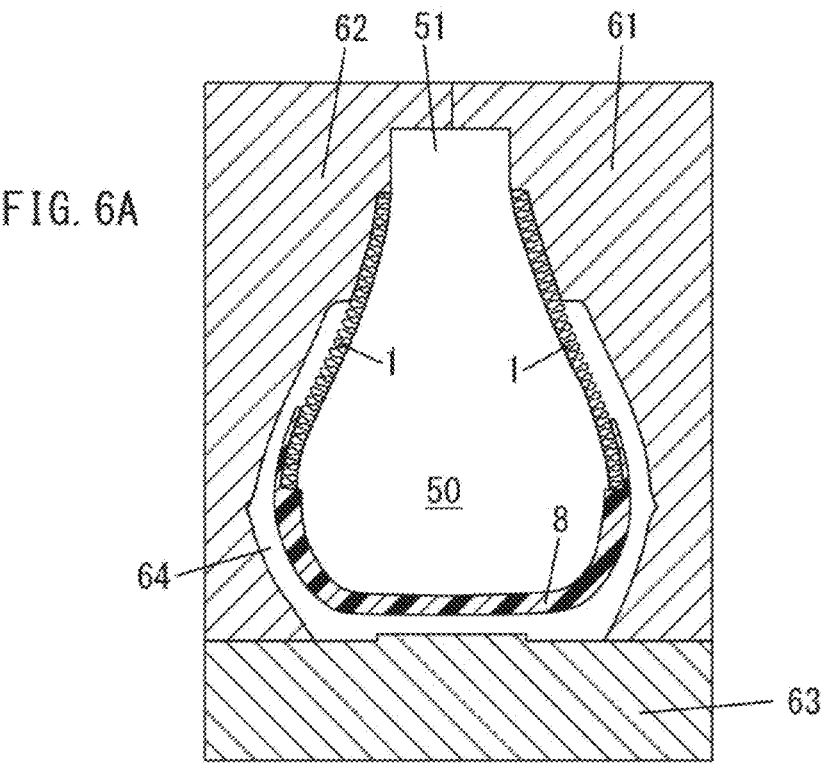
FIGS. 6A and 6B are sectional views of the mold, etc. each showing a molding step.
Figure 6B:
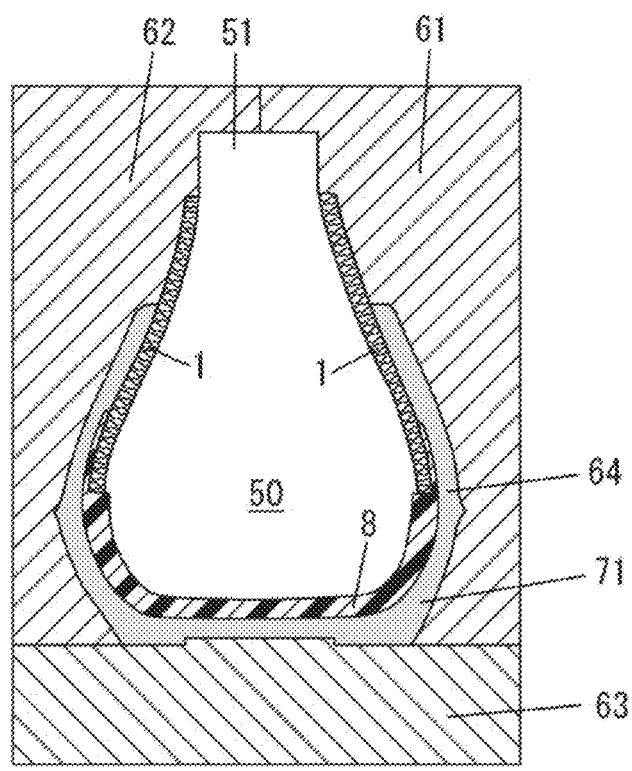

Next, as shown in FIGS. 5B and 6A, the first to third outer molds 61 to 63 are clamped. At this time, the first and second outer molds 61 and 62 get closer to each other in the width direction W and the third outer mold 63 moves toward a sole section of the core 50.

As a result of the foregoing clamping, a cavity 64 is formed between the first to third outer molds 61 to 63 and the upper member 1 or the resin part 8. In a portion in which the outsole member 2 is not to be formed, the core 50 and each of the outer molds 61 to 63 contact each other under pressure through the upper member 1.

After the clamping, molten resin 71 to become the outsole member 2 is supplied into the cavity 64 between the first to third outer molds 61 to 63 and the upper member 1. After the supply, the molten resin 71 is cooled and cured to form the outsole member 2 integrally with the upper member 1.

During the curing of the molten resin 71, the outsole member 2 is attached to the outer surface of the upper member 1 by the foregoing welded structure. Meanwhile, the outsole member 2 is not attached to a surface of the resin part 8 made of polypropylene.

Next, as shown in FIG. 7A, the first to third outer molds 61 to 63 are opened. After the mold opening, the resin part 8 in FIG. 7A is extracted from the interior space S. In this way, an intermediate product of the shoe with the outsole member 2 integrally formed with the upper member 1 in FIG. 7B is produced by injection molding.

After extraction of the resin part 8, the window portion 20 and the annular edge E appear on the intermediate product. The annular edge E is not bonded to the outsole member 2.

Next, the sock liner 3 is mounted into the interior space S of the intermediate product. The sock liner 3 may be bonded or may not be bonded to the outsole member 2. The annular edge E is in a contact state of contacting the inner surface of the outsole member and being sandwiched between the outer surface of the sock liner 3 and the inner surface of the outsole member 2 without being bonded to these surfaces.

FIGS. 8A to 12B show a second embodiment.

Differences of the second embodiment from the foregoing first embodiment will mainly be described.

As shown in FIGS. 8A to 9B, the opening 10 of this embodiment is not formed on the side surface 11 on the medial foot section Me as understood particularly from FIG. 9A but it extends continuously across the side surface 12 on the lateral foot section La in FIG. 9B, the back surface 13 in FIG. 9C, and the bottom surface in FIG. 9D.

The first edge E1 in FIG. 9C starts from the bottom surface 4, extends upward on the back surface 13 on the medial foot section Me, and extends further from the medial foot section Me in the transverse direction (width direction W) toward the lateral foot section La. The second edge E2 in FIG. 9B connected to the first edge E1 starts from the back surface 13 and extends in a parabolic shape toward the front direction F and the downward direction Z1 along the side surface 12 on the lateral foot section La and on the side surface 12 on the lateral foot section La to reach the first position 41 of the bottom surface 4 on the side of the lateral foot section La. The third edge E3 in FIG. 9D connected to the second edge E2 extends on the bottom surface 4 from the first position 41 of the bottom surface 4 in the width direction W to the second position 42 of the bottom surface 4 on the side of the medial foot section Me in such a manner as to go across the bottom surface 4 in the width direction W. The fourth edge E4 connected to the third edge E3 extends on the bottom surface 4 on the medial foot section from the second position 42 of the bottom surface 4 toward the rear direction B to reach the back surface 13, and is connected to the first edge E1 in FIG. 9C.

Figure 8A:
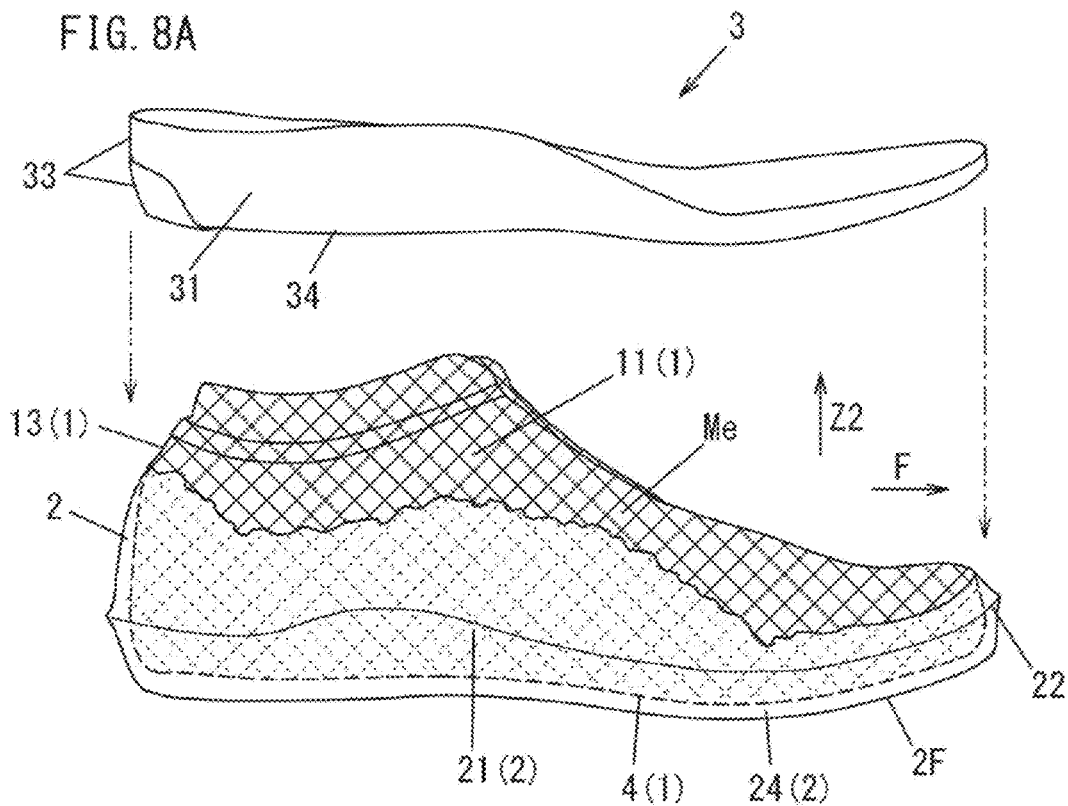
FIGS. 8A and 8B are an exploded medial view and an exploded lateral view respectively of a shoe each relating to a second embodiment of the present invention and showing the shoe from which a sock liner is detached.
Figure 8B:
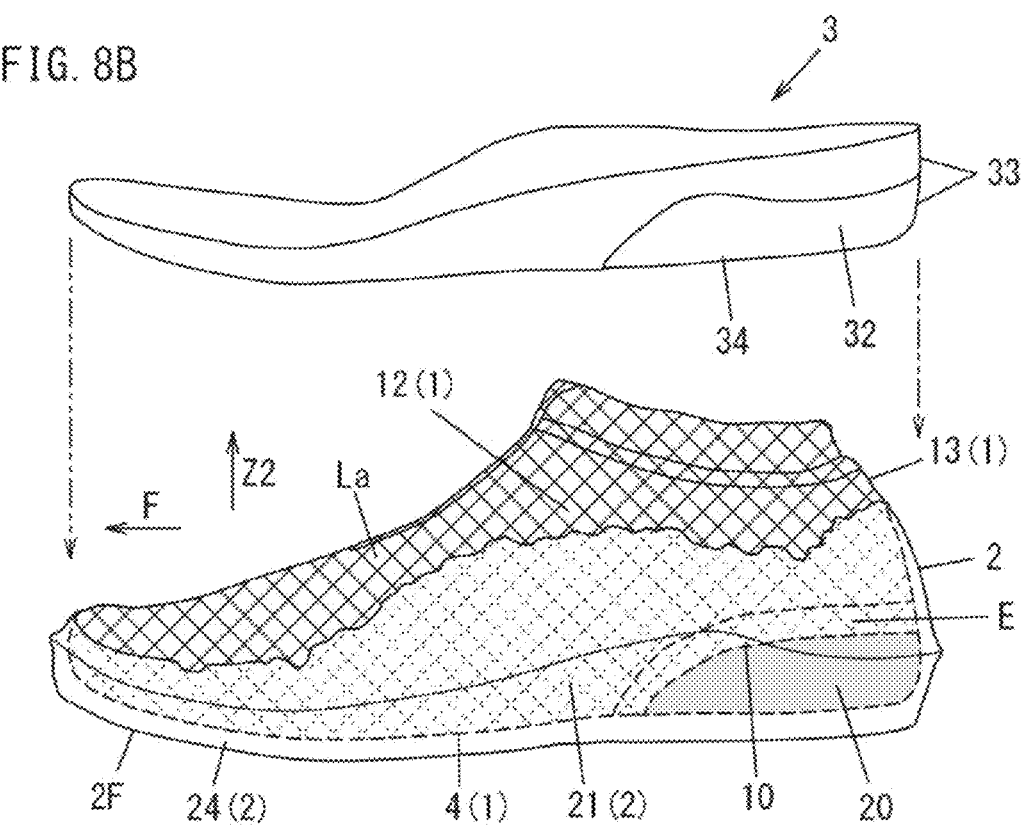
Figure 10A:
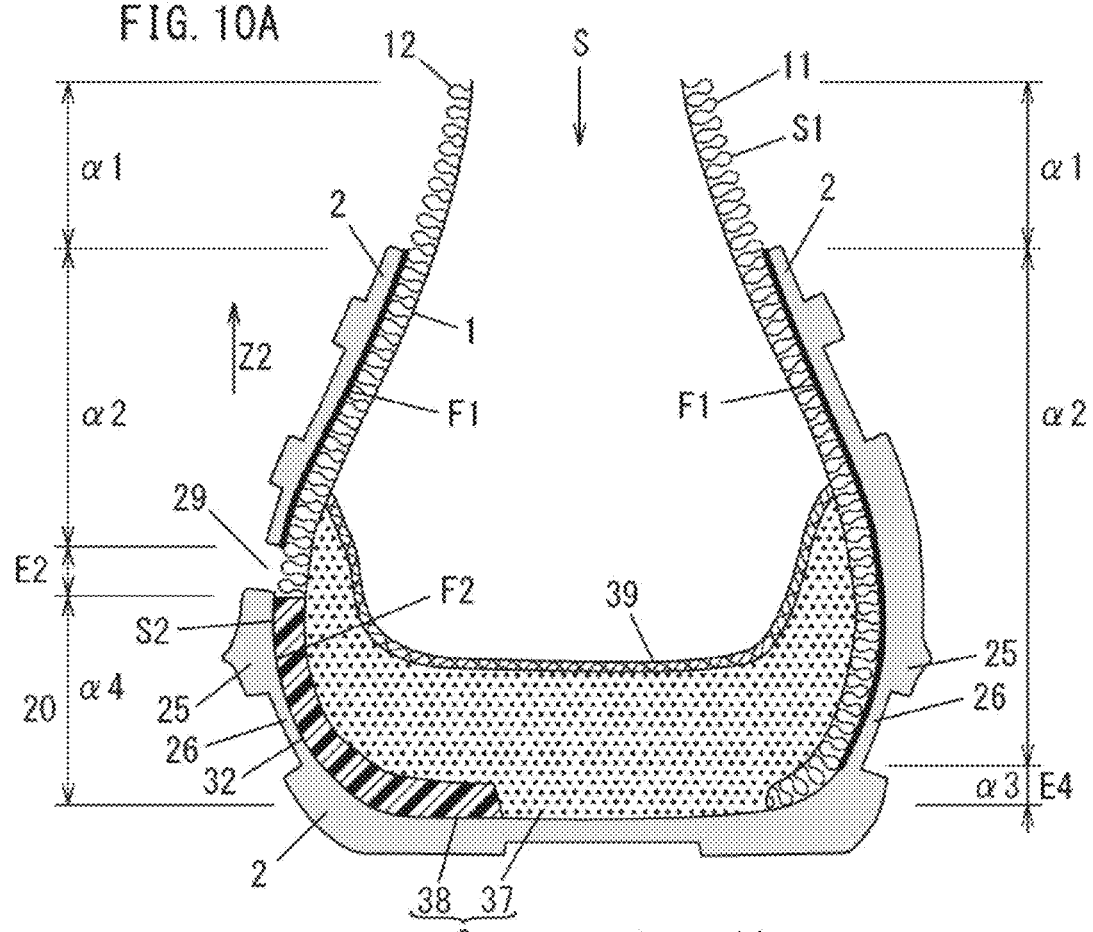
FIGS. 10A and 10B are a cross-sectional view and a lateral view respectively of a rearfoot portion of the shoe.
Figure 10B:
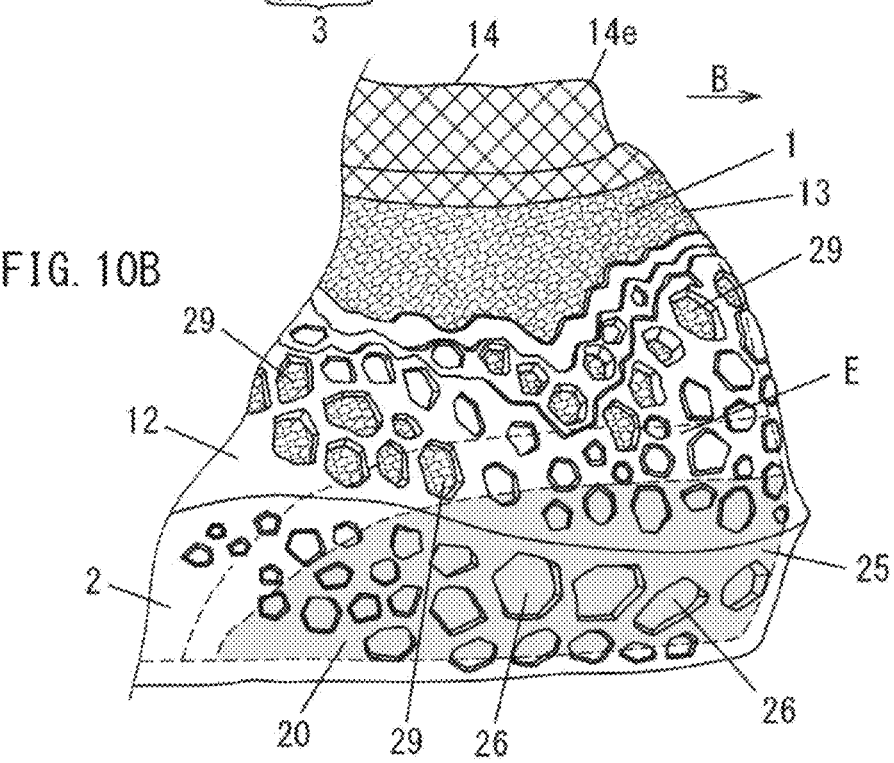

The outsole member 2 including the window portion 20 is made of a semi-transparent material. Thus, in this embodiment, each of the outer side surface 32, the back surface 33, and the bottom surface 34 of the sock liner 3 in FIG. 8B is partially visible through the window portion 20 of the outsole member 2 covering the opening 10 of the upper member 1.

An exemplary method of manufacturing the shoe of the second embodiment will be described next by referring to FIGS. 11A to 12B. In the manufacturing method of this embodiment, the core 50, the resin part 8, and the first to third outer molds 61 to 63 are also prepared in advance.

Figure 11A:
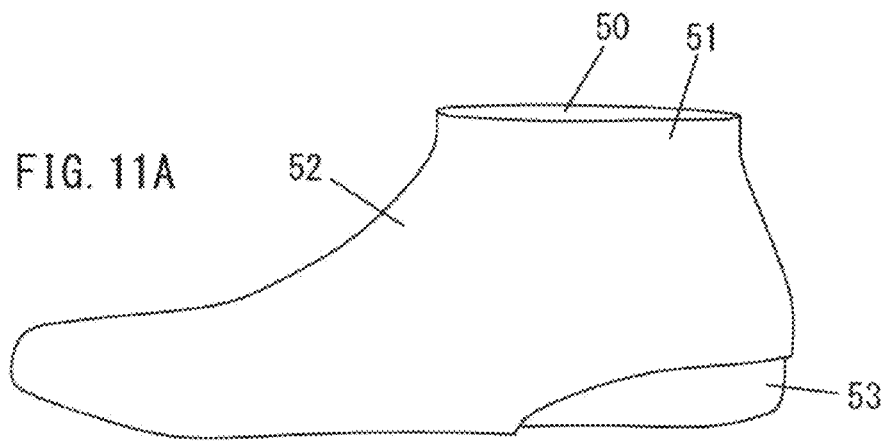
FIG. 11A is a perspective view showing a core (last)
Figure 11B:
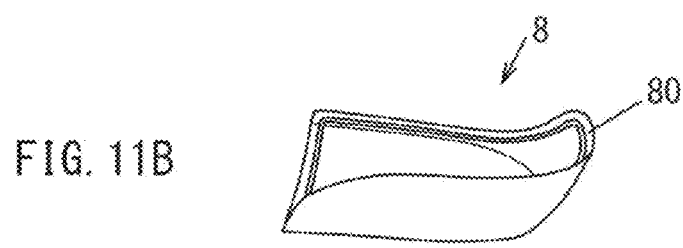
FIG. 11B is a perspective view showing a resin part.
Figure 11C:
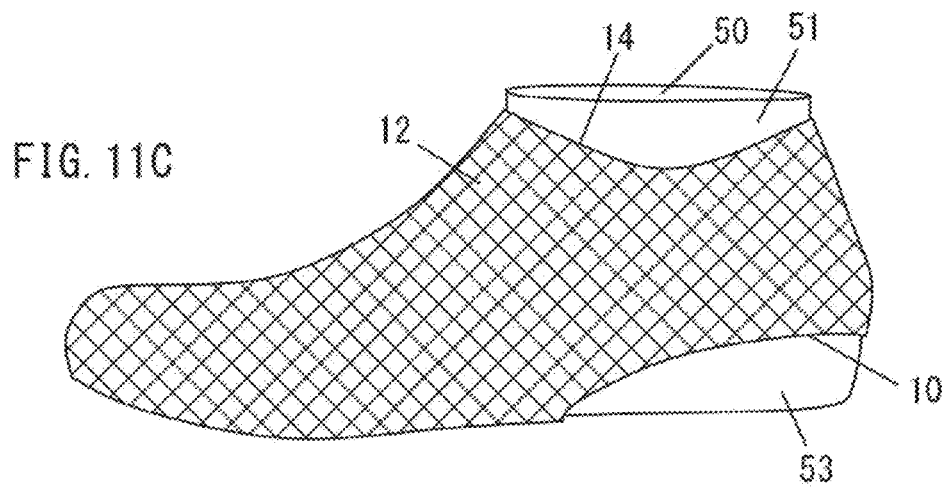
FIG. 11C is a perspective view showing the core on which an upper member is mounted.
Figure 11D:
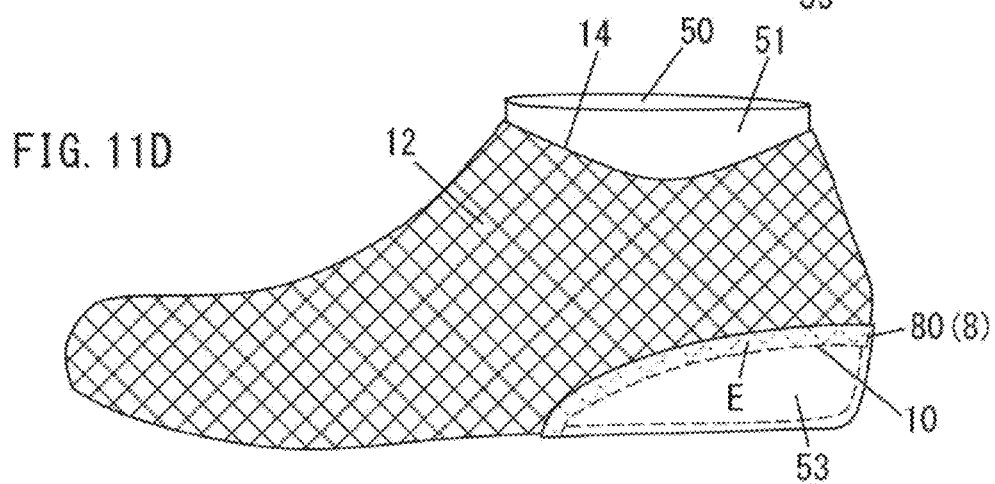
FIG. 11D is a perspective view showing a state in which the resin part is mounted on the core with the upper member.
Figure 12A:
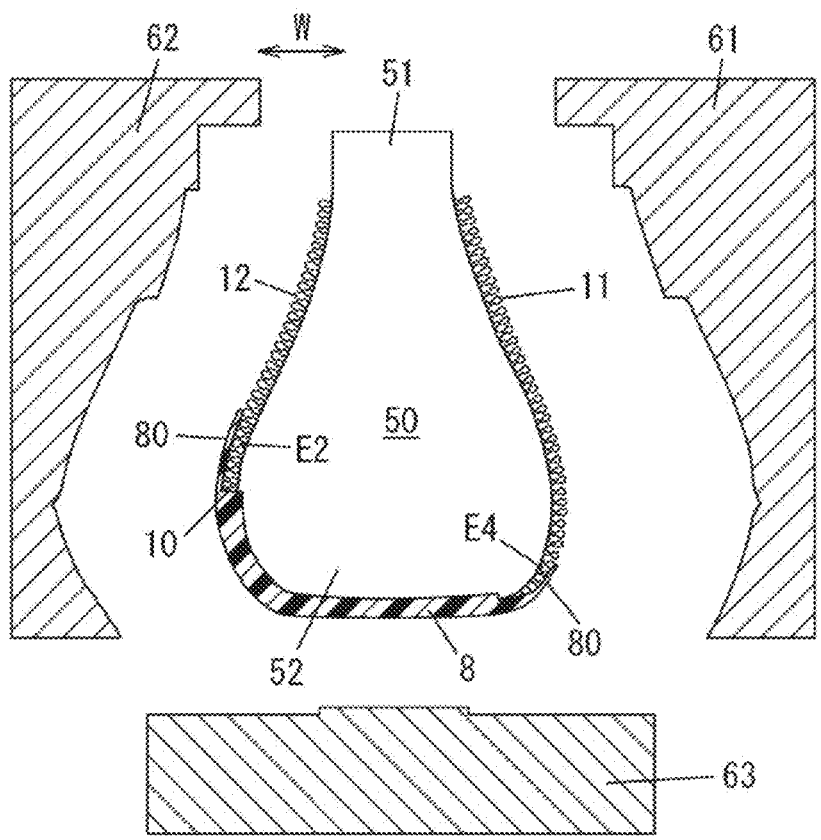
FIGS. 12A and 12B are sectional views of a mold, etc. each showing a molding step.
Figure 12B:
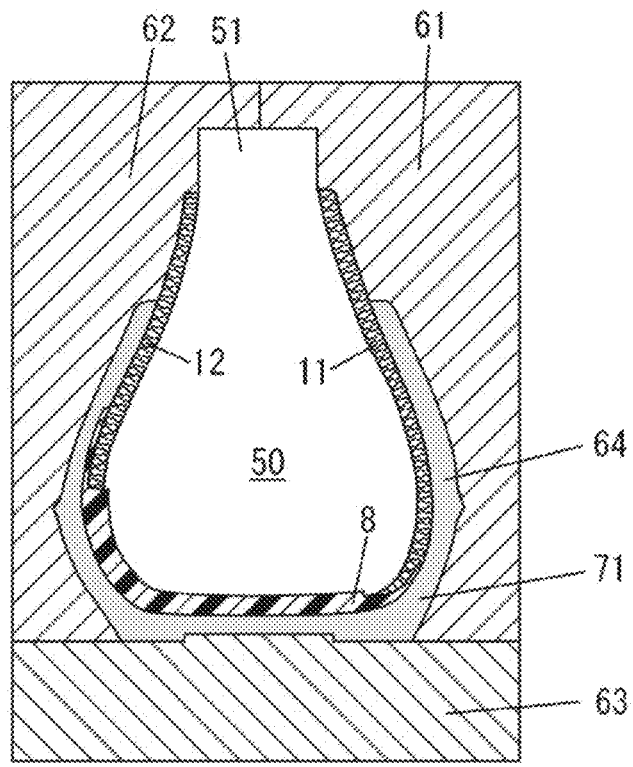

The resin part 8 in FIG. 11B is made of polypropylene, for example, and is configured to be engaged with the heel part 53 of the core 50, as shown in FIG. 11D. More specifically, the shape of the heel part 53 of the core 50 is like a cut formed in a surface on the lateral foot section, as shown in FIG. 11A. Meanwhile, the resin part 8 of a scoop-like shape has the thin outer periphery 80 to achieve the engagement of the resin part 8 with the heel part 53 of the core 50, as shown in FIG. 11D. As shown in FIGS. 11B and 12A, the resin part 8 is formed in such a manner that the outer periphery 80 on the side of the lateral foot section is located above the outer periphery on the side of the medial foot section.

As shown in FIGS. 11C to 12B, steps same as those of the first embodiment are performed in this embodiment to produce the shoe shown in FIGS. 9A to 9D.

As understood from a comparison between FIGS. 12A and 5A, while the resin part 8 is unlikely to come off from the core 50 or to be shifted in position from the core 50 in the structure of the first embodiment in FIG. 5A, the resin part 8 may be attached adhesively to the core 50 in the second embodiment in FIG. 12A in order to prevent the resin part 8 from coming off from the core 50 or from being shifted in position from the core 50.

The other configurations and the other manufacturing steps of this embodiment are the same as those of the foregoing first embodiment shown in FIGS. 1A to 7C, and thus they will not be illustrated and described in detail.

Figure 13A:
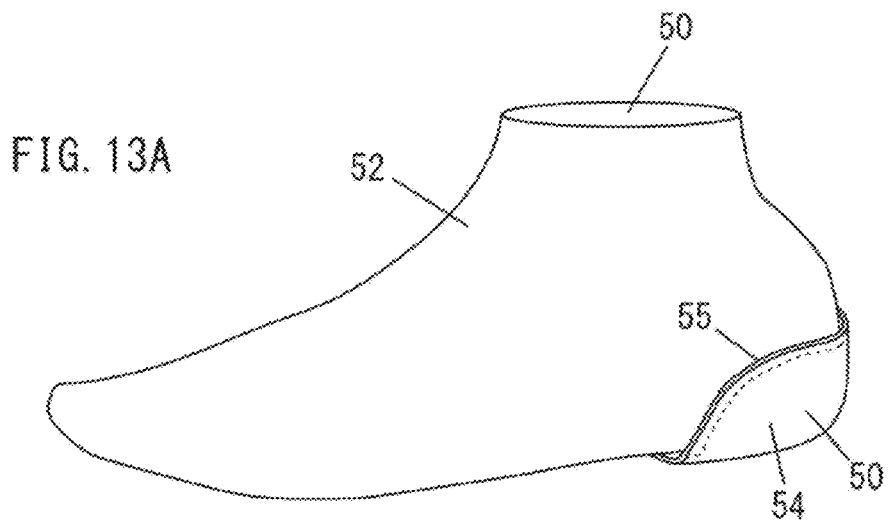
FIGS. 13A and 13B are perspective views and FIG. 13C is a sectional view of a last showing a step of a different manufacturing method.
Figure 13B:
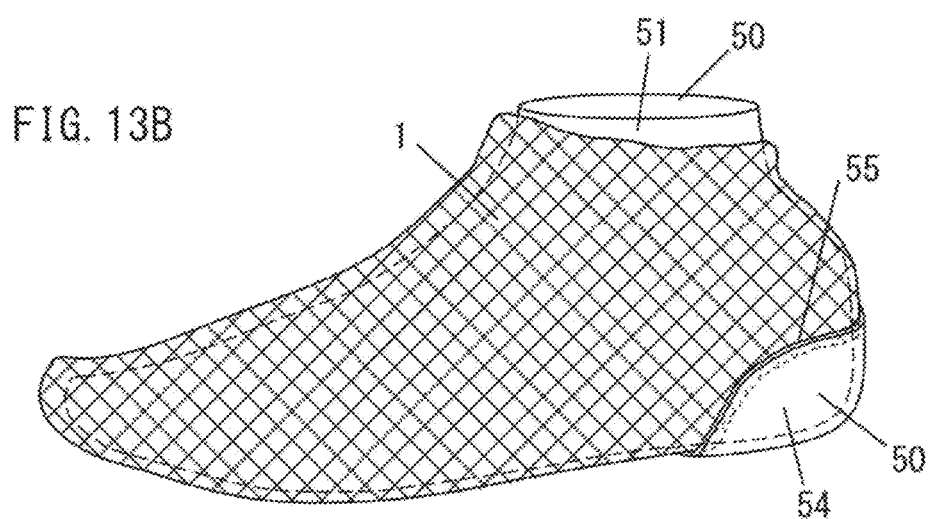
Figure 13C:
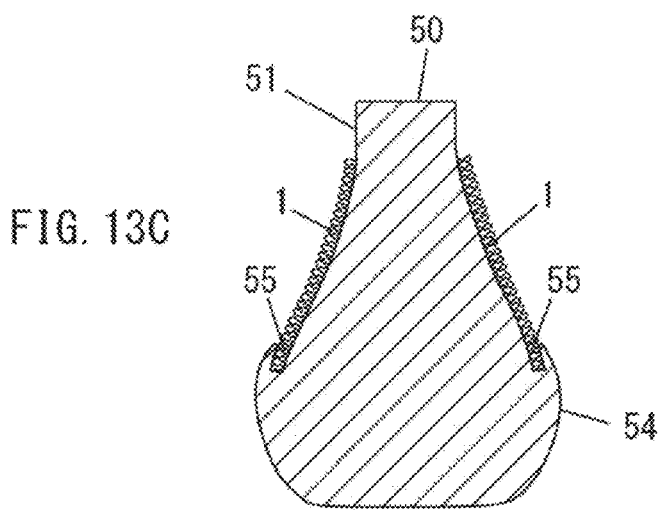

FIGS. 13A to 13C show a partial step of a different manufacturing method.

In this embodiment, a heel part of a last to become the core 50 is provided with an unattached portion 54 coated with polyolefin-based resin. The molten resin 71 is not to be welded to the unattached portion 54.

As shown in FIGS. 13B and 13C, the unattached portion 54 forms a labyrinth structure 55 for letting the upper member 1 penetrate therein. This prevents penetration of the molten resin 71 in between the upper member 1 and a surface of the last 50.

Figure 14A:
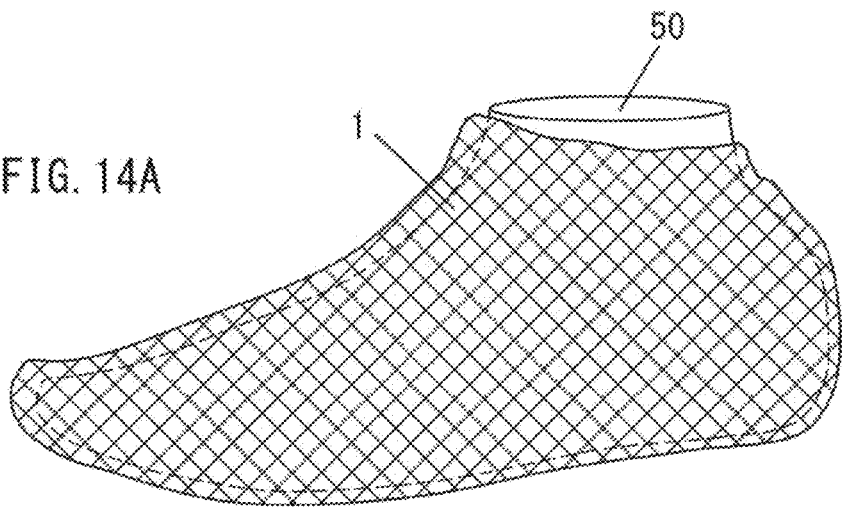
FIGS. 14A, 14B, and 14C are perspective views of the last, etc. showing a step of a still different manufacturing method.
Figure 14B:
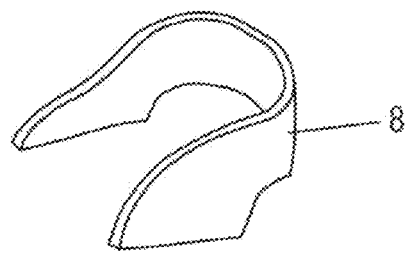
Figure 14C:
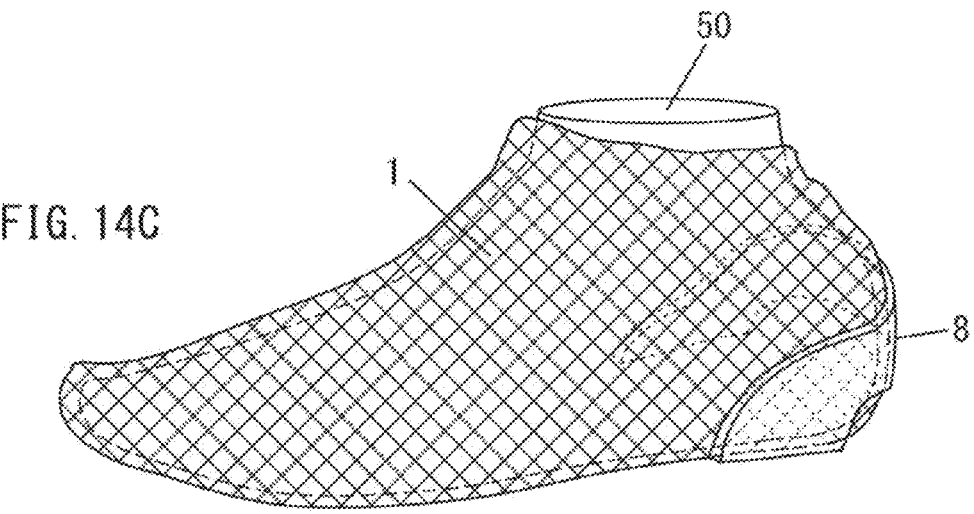

FIGS. 14A to 14C show a partial step of a still different manufacturing method.

As shown in FIG. 14A, this embodiment uses the sock-like upper member 1 at which an opening is not formed in advance, and the resin part 8 in FIG. 14B.

In this embodiment, the upper member 1 is mounted first on the last-like core 50, as shown in FIG. 14A. Next, the strip-like resin part 8 in FIG. 14B is mounted to be placed on the upper member 1, as shown in FIG. 14C. After this mounting, the outsole member 2 is molded in such a manner as to be formed integrally with the upper member 1, as described above. After the molding, the upper member 1 is cut along the edge of the resin part 8. After the cutting, the resin part 8 and a part of the upper member 1 are removed to form the opening.

In the present invention, the opening 10 in FIGS. 1A and 1B may be formed not at a rearfoot portion of the shoe but only at a midfoot portion or a forefoot portion of the shoe. The opening 10 may be formed only on the lateral foot section or only on the medial foot section. Alternatively, the opening 10 may be formed to extend along the entire length of the upper member 1.

Figure 16A:
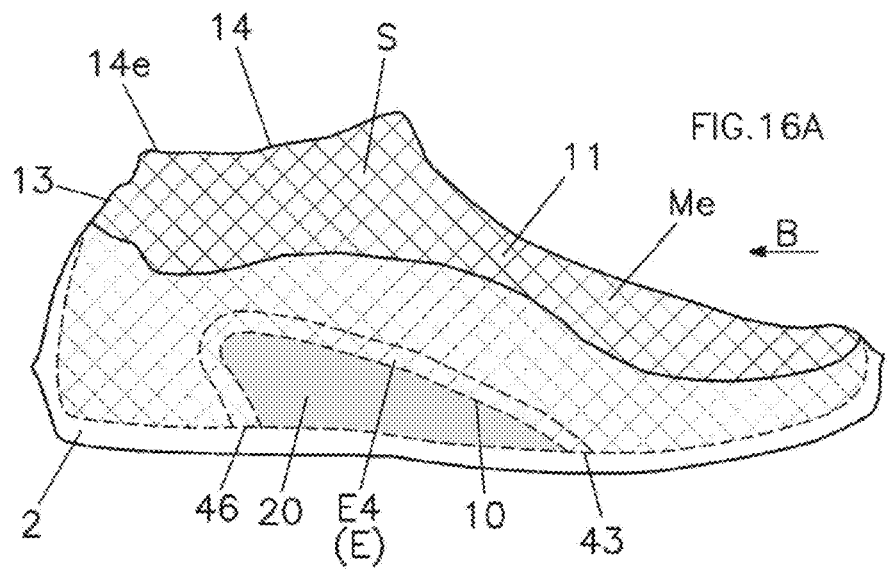
FIGS. 16A, 16B, and 16C are a medial view, a lateral view, and a bottom view respectively each showing a third embodiment.
Figure 16B:
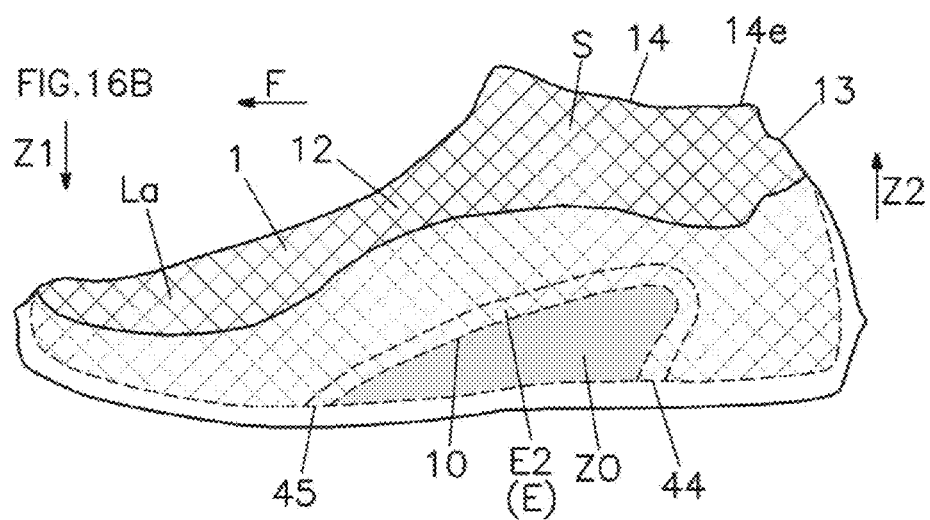
Figure 16C:
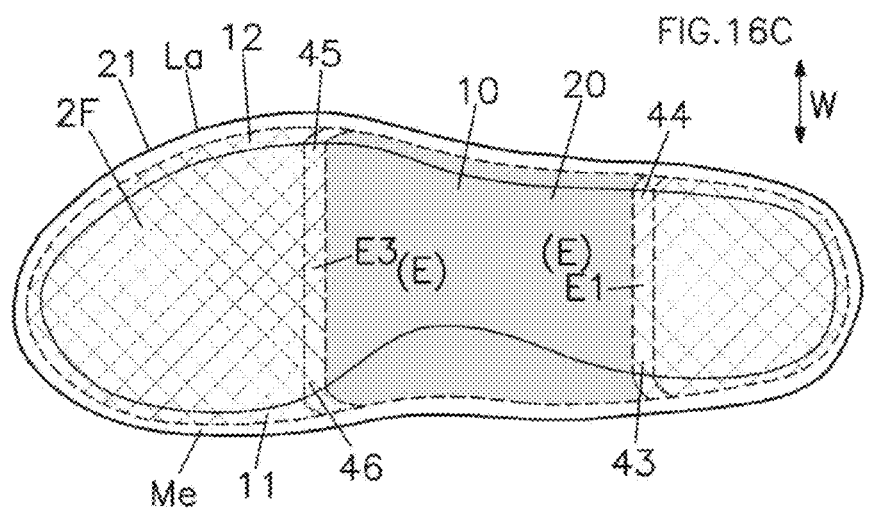

FIGS. 16A to 16C show a third embodiment.

In this embodiment, the opening 10 is formed at a midfoot portion by cutting a part of the side surface 11 on the medial foot section, a part of the side surface 12 on the lateral foot section, and a part of the bottom surface 4. The annular edge E defining the opening 10 includes the first to fourth edges E1 to E4 and forms a loop.

In FIG. 16C, the first edge E1 extends on the bottom surface 4 in the transverse direction from a third position 43 of the bottom surface 4 on the side of the medial foot section Me to a fourth position 44 of the bottom surface on the side of the lateral foot section. The second edge E2 rises from the fourth position 44 toward the side surface 12 on the lateral foot section in FIG. 16B, extends along the side surface 12 on the lateral foot section toward the front direction F on the side surface 12 on the lateral foot section, and extends further from the side surface 12 on the lateral foot section downward to a fifth position 45 of the bottom surface 4 on the side of the lateral foot section in FIG. 16C.

In FIG. 16C, the third edge E3 starts from the fifth position 45 of the bottom surface 4 on the side of the lateral foot section La and extends on the bottom surface 4 toward the medial foot section in the width direction W to reach a sixth position 46 of the bottom surface 4. The fourth edge E4 starts from the sixth position 46 of the bottom surface 4 and extends on the side surface 11 on the medial foot section in FIG. 16A toward the rear direction B to reach the third position 43 of the bottom surface 4.

The fourth position 44 and the fifth position 45 are arranged on the side of the lateral foot section La. The third position 43 and the sixth position 46 are arranged on the side of the medial foot section Me. The fifth position 45 and the sixth position 46 are closer to the front direction F than the fourth position 44 and the third position 43 respectively.

The other configurations and the other manufacturing steps of this embodiment are the same as those of the foregoing first embodiment shown in FIGS. 1A to 7C, and thus they will not be illustrated and described in detail.

Figure 17A:
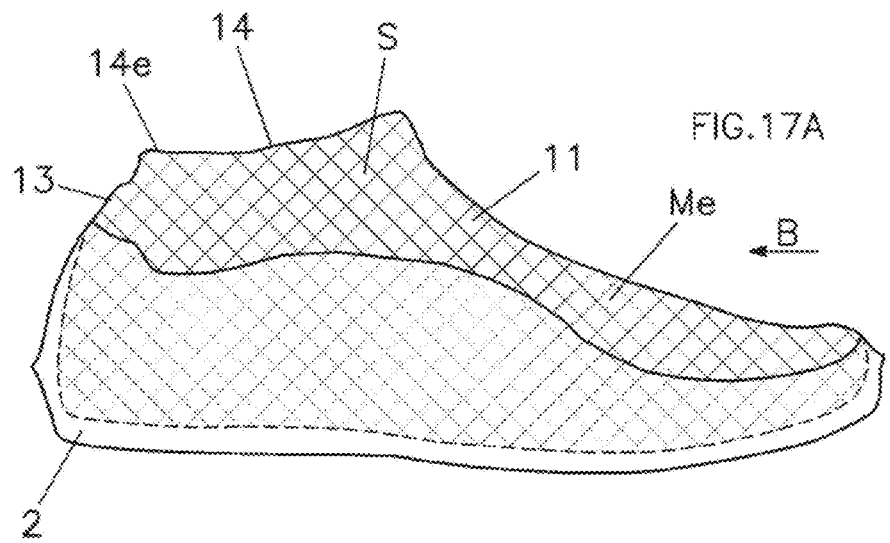
FIGS. 17A, 17B, and 17C are a medial view, a lateral view, and a bottom view respectively each showing a fourth embodiment.
Figure 17B:
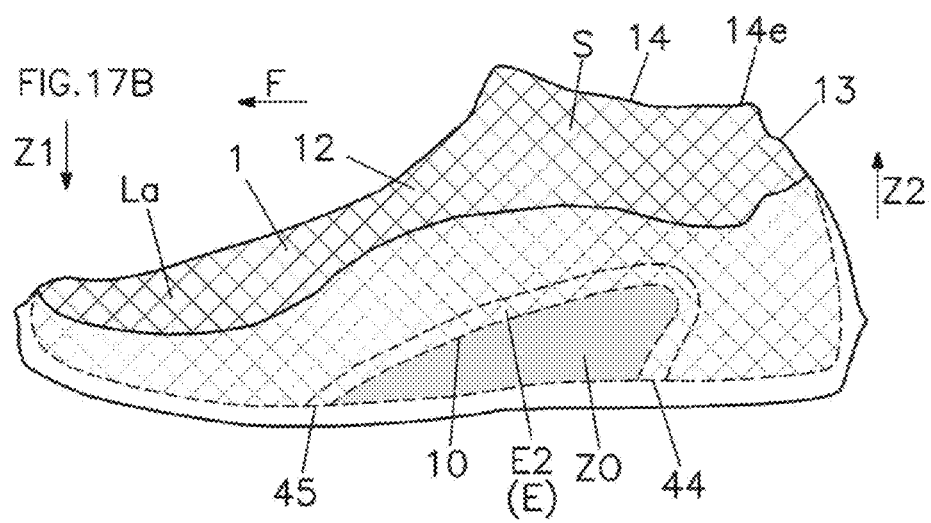
Figure 17C:
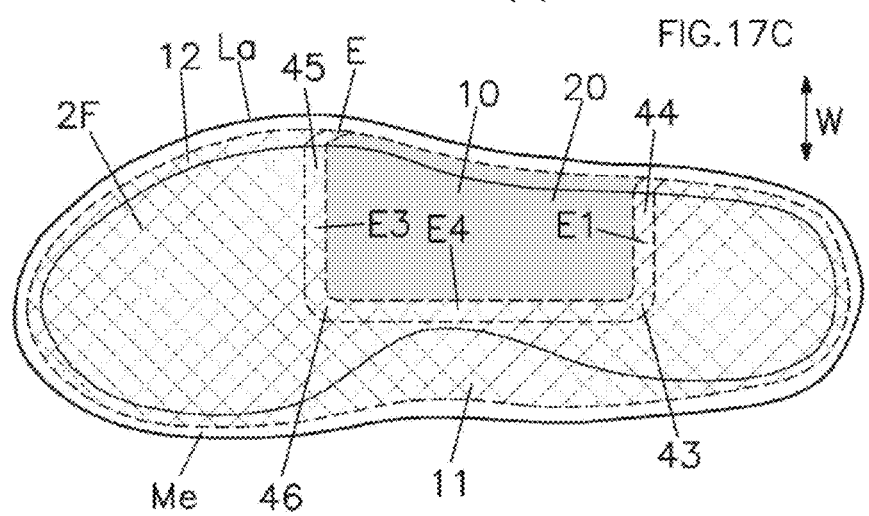

FIGS. 17A to 17C show a fourth embodiment.

In this embodiment, the opening 10 is formed at a midfoot portion and is not formed on the side surface 11 on the medial foot section Me but is formed only on a part of the side surface 12 on the lateral foot section La and only on a part of the bottom surface 4.

In FIG. 17C, the first edge E1 extends on the bottom surface 4 in the transverse direction from the third position 43 of the bottom surface 4 to the fourth position 44 of the bottom surface on the side of the lateral foot section. The second edge E2 rises from the fourth position 44 toward the side surface 12 on the lateral foot section in FIG. 17B, extends along the side surface 12 on the lateral foot section toward the front direction F on the side surface 12 on the lateral foot section, and extends further from the side surface 12 on the lateral foot section downward to the fifth position 45 of the bottom surface 4 on the side of the lateral foot section in FIG. 17C.

In FIG. 17C, the third edge E3 starts from the fifth position 45 of the bottom surface 4 on the side of the lateral foot section La and extends on the bottom surface 4 toward the medial foot section in the width direction W to reach the sixth position 46 of the bottom surface 4. The fourth edge E4 starts from the sixth position 46 of the bottom surface 4 and extends toward the rear direction B on the bottom surface 4 in FIG. 17C to reach the third position 43 of the bottom surface 4.

The fourth position 44 and the fifth position 45 may be arranged on the side of the lateral foot section La. The third position 43 and the sixth position 46 may be arranged near the center.

The other configurations and the other manufacturing steps of this embodiment are the same as those of the foregoing second embodiment shown in FIGS. 8A to 12B, and thus they will not be illustrated and described in detail.

In each of the foregoing embodiments, the outsole member 2 is made of a semi-transparent single material consistent between all the portions. Alternatively, the outsole member 2 may be formed by two-color molding using different materials in combination.

While the preferred embodiments have been described above by referring to the drawings, various obvious changes and modifications will readily occur to those skilled in the art upon reading the present description.

For example, the outsole member 2 can be molded after sewing a quarter lining or a tongue on the upper member 1 in advance.

The outsole member 2 may be FRP containing reinforcing fibers.

After the molding, a lacing aperture may be formed at a predetermined position by machining, for example. Further, during molding of the outsole member 2, a different reinforcing member for reinforcing the arch of a midfoot section may be formed by insert molding.

Thus, such changes and modifications are deemed to fall within the scope of the present invention, which is defined by the appended claims.

INDUSTRIAL APPLICABILITY

The present invention is applicable to a shoe with an outsole member molded integrally with an upper member.

REFERENCE SIGNS LIST

1: Upper member 10: Opening 11, 12: Side surface 13: Back surface 14: Wearing opening
14e: Posterior end
2: Outsole member 2F: Contact surface 20: Window portion 21: Peripheral portion 22: Entire peripheral rib 24: Bottom portion 25: Thick portion 26: Thin portion 29: Through hole
3: Sock liner 31, 32: Side surface 33: Back surface 34: Bottom surface 37: Foamed layer
38: Non-foamed layer 39: Fiber layer
4: Bottom surface 41 to 46: First to sixth positions
50: Core 51: Core print 52: Last portion: 53: Heel part
61, 62, 63 Outer mold 64: Cavity
71: Molten resin
8 Resin part 80: Outer periphery
E: Annular edge E1: First edge E2: Second edge E3: Third edge E4: Fourth edge
F1: Interface F2: Inner surface of window portion
S: Space S1: Outer surface of upper member S2: Outer surface of sock liner
F: Front direction B: Rear direction Z1: Downward direction Z2: Upward direction W: Width direction
La: Lateral foot section Me: Medial foot section
α1: Exposed region α2: Welded region α3: Non-welded region α4: Window region

The invention claimed is:

1. A shoe comprising:
an upper member containing a knit fabric, a knit-like fabric, and/or a woven fabric as a primary member and forming a part of a side surface on a medial foot section, a part of a side surface on a lateral foot section, and a part of a back surface;
an outsole member made of thermoplastic resin and forming a bottom portion including a ground contact surface, the outsole member forming a peripheral portion,
the peripheral portion being attached at least partially to respective lower parts of the side surfaces on the medial side and on the lateral side and a lower part of the back surface of the upper member, the peripheral portion being connected to the bottom portion; and
a sock liner inserted in an interior space defined by the upper member and the outsole member, wherein
the upper member includes a wearing opening for insertion of a foot into the interior space and an opening at which at least a part of the side surface on the lateral foot section is missing, the opening being separate from the wearing opening,
the outsole member includes a window portion covering the opening,
the window portion is made of a semi-transparent material that makes at least a part of a side surface on the lateral foot section of the sock liner in the interior space visible through the window portion covering the opening,
the upper member includes an annular edge that defines the opening at which at least a part of the side surface on the lateral foot section of the upper member and a part of the bottom surface of the upper member are missing, and the upper member is between the sock liner and the window portion at a portion of the annular edge.

2. The shoe according to claim 1, wherein
the outsole member extends further toward a front direction and an upward direction than the annular edge, and
the outsole member penetrates into an outer surface of the upper member in a portion of the upper member other than the annular edge to form a welded structure in which the outsole member is anchored, thereby attaching the outsole member to the upper member.

3. The shoe according to claim 2, wherein
an inner surface of the window portion of the outsole member has lower surface roughness than an interface of the outsole member attached to the upper member, the interface being between the outsole member and the upper member.

4. The shoe according to claim 2, wherein
a contact state is formed at the annular edge in which the outer surface of the upper member contacts at least a part of the outsole member without being attached to the outsole member.

5. The shoe according to claim 1, wherein
an outer surface of the upper member has different lightness from at least a part of an outer surface of the sock liner arranged at the window portion.

6. The shoe according to claim 1, wherein
the opening extends continuously at least from the side surface on the lateral foot section of the upper member to the bottom surface of the upper member.

7. The shoe according to claim 6, wherein
the opening extends continuously at least from the side surface on the lateral foot section and the bottom surface of the upper member to the back surface of the upper member.

8. The shoe according to claim 1, wherein
the window portion of the outsole member at least on the side surface on the lateral foot section is provided with a thick portion and a thin portion thinner than the thick portion.

9. A method of manufacturing the shoe according to claim 1, comprising:
a mounting step of mounting the upper member including the wearing opening and the opening on a last portion of a core including the last portion;
a loading step of loading the core in between a plurality of outer molds meshed with each other in a width direction of the shoe;
a step of clamping the outer molds;
a step of supplying molten resin to become the outsole member between the outer molds and the upper member;
a step of curing the molten resin to form the outsole member integrally with the upper member;
a step of opening the outer molds; and
a step of engaging a resin part with the core before the loading step of loading the core, the resin part closing the opening of the upper member.

10. The manufacturing method according to claim 9, wherein
the engaging step is performed before the loading step of loading the core and after the mounting step of mounting the upper member.

11. A shoe comprising:
a sock-like upper member containing a knit fabric, a knit-like fabric, and/or a woven fabric as a primary member and including a bottom surface, a side surface on a medial foot section, a side surface on a lateral foot section, and a back surface;

an outsole member made of thermoplastic resin and forming a bottom portion attached to the bottom surface, the bottom portion including a ground contact surface, the outsole member forming a peripheral portion attached to respective lower parts of the side surfaces and a lower part of the back surface of the upper member, the peripheral portion being connected to the bottom portion; and a sock liner inserted in an interior space defined by the upper member and the outsole member, wherein the upper member includes a wearing opening for insertion of a foot into the interior space and an annular edge that defines an opening at which at least a part of the side surface on the lateral foot section, a part of the back surface, and a part of the bottom surface are missing, the opening being separate from the wearing opening, the annular edge includes a first edge, a second edge, a third edge, and a fourth edge forming a loop, the first edge extending on the back surface in a transverse direction, the second edge starting from the back surface and extending toward a front direction and a downward direction along the side surface on the lateral foot section and on the side surface on the lateral foot section to reach a first position of the bottom surface, the third edge extending on the bottom surface from the first position of the bottom surface medially in a width direction to a second position of the bottom surface, the fourth edge starting from the second position of the bottom surface and extending on the side surface on the medial foot section or on the bottom surface toward a rear direction to reach the back surface, the outsole member extends from the bottom portion along the back surface and the side surfaces of the upper member further toward an upward direction than the annular edge, and the outsole member includes a window portion covering the opening, the window portion is made of a semi-transparent material that makes at least a part of a side surface on the lateral foot section, a part of a back surface, and a part of a bottom surface of the sock liner in the interior space visible through the window portion covering the opening, and the upper member is between the sock liner and the window portion at a portion of the annular edge.

12. The shoe according to claim 11, wherein
the outsole member extends further toward the front direction and the upward direction than the annular edge, and
the outsole member penetrates into an outer surface of the upper member in a portion of the upper member other than the annular edge to form a welded structure in which the outsole member is anchored, thereby attaching the outsole member to the upper member.

13. The shoe according to claim 12, wherein
an inner surface of the window portion of the outsole member has lower surface roughness than an interface of the outsole member attached to the upper member, the interface being between the outsole member and the upper member.

14. The shoe according to claim 11, wherein
the outer surface of the upper member has different lightness from at least a part of an outer surface of the sock liner arranged at the window portion.

15. The shoe according to claim 11, wherein
a contact state is formed at the annular edge in which the outer surface of the upper member contacts at least a part of the outsole member without being attached to the outsole member.

16. A method of manufacturing the shoe according to claim 11, comprising:
a mounting step of mounting the upper member including the wearing opening and the opening on a last portion of a core including the last portion;
a loading step of loading the core in between a plurality of outer molds meshed with each other in the width direction;
a step of clamping the outer molds;
a step of supplying molten resin to become the outsole member between the outer molds and the upper member;
a step of curing the molten resin to form the outsole member integrally with the upper member;
a step of opening the outer molds; and
a step of engaging a resin part with the core before the loading step of loading the core, the resin part closing the opening of the upper member.

17. The manufacturing method according to claim 16, wherein
the engaging step is performed before the loading step of loading the core and after the mounting step of mounting the upper member.

18. The manufacturing method according to claim 16, wherein
in the engaging step, the resin part is engaged with the core in such a manner that the resin part is fitted to a heel part of the last portion and an outer periphery of the resin part overlaps an outer surface of the upper member at the annular edge forming the loop of the upper member.

19. The manufacturing method according to claim 18, wherein
the resin part is made of different resin from the outsole member,
the method further comprising a step of removing the resin part after the step of opening the outer molds.

20. A shoe comprising:
a sock-like upper member containing a knit fabric, a knit-like fabric, and/or a woven fabric as a primary member and including a bottom surface, a side surface on a medial foot section, a side surface on a lateral foot section, and a back surface;
an outsole member made of thermoplastic resin and forming a bottom portion attached to the bottom surface, the bottom portion including a ground contact surface,
the outsole member forming a peripheral portion attached to respective lower parts of the side surfaces of the upper member, the peripheral portion being connected to the bottom portion; and
a sock liner inserted in an interior space defined by the upper member and the outsole member, wherein
the upper member includes a wearing opening for insertion of a foot into the interior space and an annular edge that defines an opening at which at least a part of the side surface on the lateral foot section and a part of the bottom surface are missing, the opening being separate from the wearing opening, the annular edge includes a first edge, a second edge, a third edge, and a fourth edge forming a loop, the first edge extending on the bottom surface in a transverse direction from a third position of the bottom surface to a fourth position of the bottom surface on a side of the lateral foot section, the second edge rising from the fourth position toward the side surface on the lateral foot section, extending along the side surface on the lateral foot section toward a front direction on the side surface on the lateral foot section, the second edge extending further from the side surface on the lateral foot section downward to a fifth position of the bottom surface on the side of the lateral foot section, the third edge starting from the fifth position of the bottom surface and extending on the bottom surface toward the medial foot section in a width direction to reach a sixth position of the bottom surface, the fourth edge starting from the sixth position of the bottom surface and extending on the side surface on the medial foot section or on the bottom surface toward a rear direction to reach the third position of the bottom surface, the outsole member extends from the bottom portion along the side surfaces of the upper member further toward an upward direction than the annular edge, and the outsole member includes a window portion covering the opening, the window portion is made of a semi-transparent material that makes at least a part of a side surface on the lateral foot section and a part of a bottom surface of the sock liner in the interior space visible through the window portion covering the opening, and the upper member is between the sock liner and the window portion at a portion of the annular edge.

\* \* \* \* \*